(12) United States Patent
Ben-Yehuda et al.

(10) Patent No.: US 7,584,422 B2
(45) Date of Patent: Sep. 1, 2009

(54) SYSTEM AND METHOD FOR DATA FORMAT TRANSFORMATION

(75) Inventors: Shai Ben-Yehuda, Ramat-Gan (IL); Sam Somech, Ramat-Gan (IL); Jacob P. Ukelson, Hof HaCarmel (IL)

(73) Assignee: Informatica Corporation, Redwood City, CA (US)

( * ) Notice: Subject to any disclaimer, the term of this patent is extended or adjusted under 35 U.S.C. 154(b) by 664 days.

(21) Appl. No.: 11/177,329

(22) Filed: Jul. 11, 2005

(65) Prior Publication Data

US 2006/0007466 A1 Jan. 12, 2006

Related U.S. Application Data

(60) Provisional application No. 60/586,694, filed on Jul. 12, 2004.

(51) Int. Cl.
*G06F 17/00* (2006.01)
(52) U.S. Cl. .......................... 715/236; 715/238; 715/234
(58) Field of Classification Search .......... 715/234–236, 715/239
See application file for complete search history.

(56) References Cited

U.S. PATENT DOCUMENTS

| 6,779,025 | B1* | 8/2004 | Wolfe et al. ................. 709/219 |
| 2003/0065936 | A1* | 4/2003 | Wray ......................... 713/200 |
| 2003/0158854 | A1* | 8/2003 | Yoshida et al. .............. 707/101 |
| 2004/0181746 | A1* | 9/2004 | McLure et al. .............. 715/500 |
| 2005/0091589 | A1* | 4/2005 | Ramarao ..................... 715/522 |
| 2005/0132284 | A1* | 6/2005 | Lloyd et al. ................. 715/517 |
| 2005/0273707 | A1* | 12/2005 | Chu et al. .................... 715/513 |
| 2006/0242563 | A1* | 10/2006 | Liu et al. .................... 715/513 |

* cited by examiner

*Primary Examiner*—Thu Huynh
(74) *Attorney, Agent, or Firm*—Fenwick & West LLP

(57) ABSTRACT

A method for defining a document format transformation process for documents similar to an example document includes the following steps. An example document is provided in a first format. At least one anchor point is then specified within the example document. The anchor points serve to mark out regions of data within the example document. Positions are then defined for respective regions within a central format. During the transformation process, the data extracted from each region is transferred into the respective position. The method enables transforming documents similar to the example document into the central format.

35 Claims, 12 Drawing Sheets

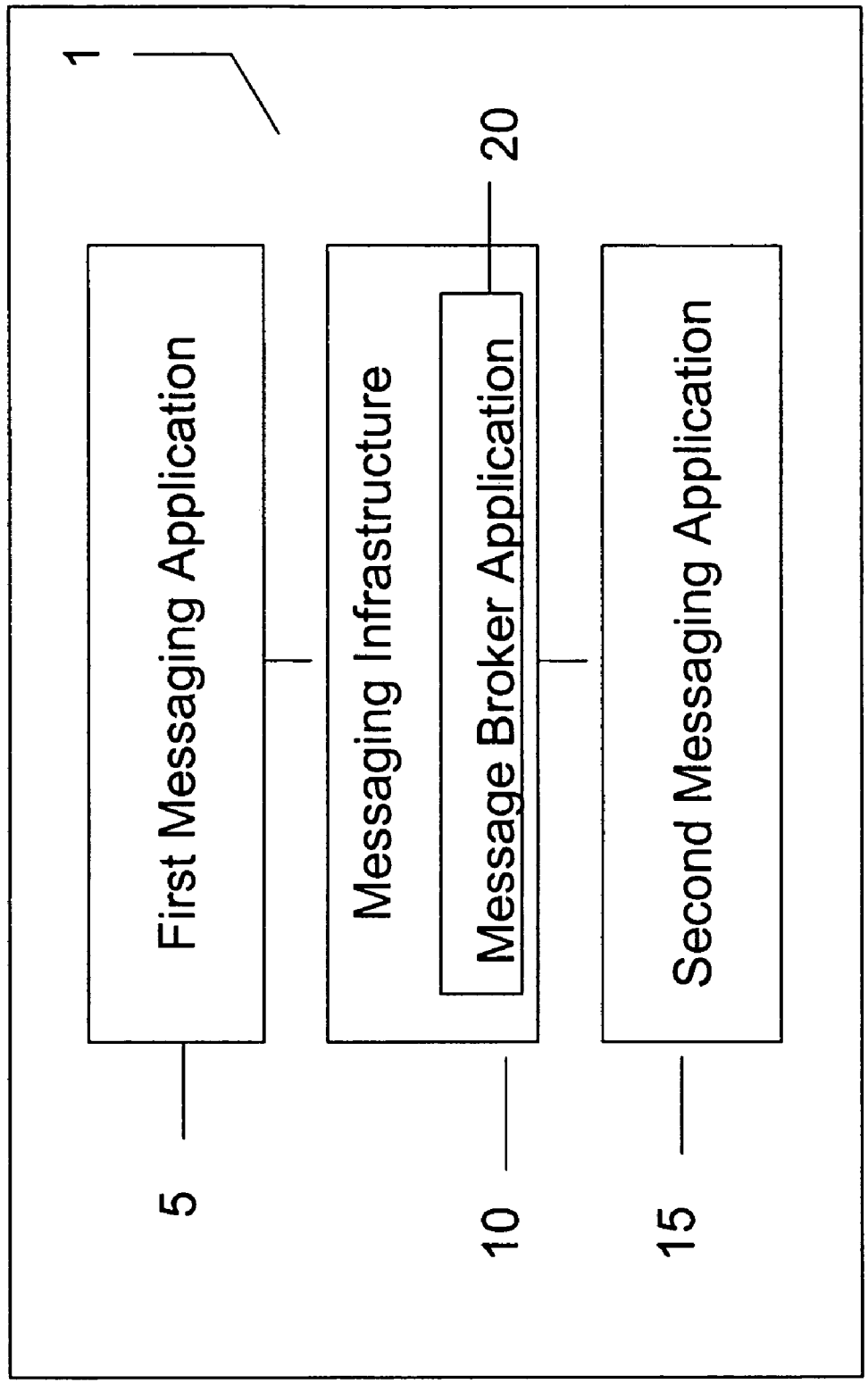
Figure 1e: Background Art

SYSTEM AND METHOD FOR DATA FORMAT TRANSFORMATION

RELATED APPLICATIONS

This application claims the benefit of U.S. Provisional Application No. 60/586,694, filed Jul. 12, 2004, which is herein incorporated in its entirety by reference.

FIELD OF THE INVENTION

The present invention relates to a system and a method for data format integration, and in particular, to such a system and method in which multiple different types of data formats can be transformed through a central transformation and integration mechanism, such that fixed, predetermined transformation methods between any two formats are not necessary.

BACKGROUND OF THE INVENTION

Although vast amounts of information are stored and are accessible through computer systems today, access across systems is not always possible. For example, some computer systems are legacy systems, which are self-contained and which have little or no flexibility in terms of data output and communication. Other systems rely on proprietary data formats, and therefore may also lack flexibility for interoperability or integration between systems.

In general, document formats may be divided into three broad categories. A structured document has completely defined format, which incorporates data in known positions of the document. A structured document is generally easily transformed by parsing the structured document to extract the required data from known positions, and then mapping the data into a different format. For example, a document in a first Extensible Markup Language (XML) structure (corresponding to a specified XML Schema Definition, i.e. XSD) may be transformed into a second XML structure (corresponding to a different XSD).

An unstructured document refers to a document that is kept in human readable form, such as Microsoft Word, Microsoft Excel, or Adobe PDF documents. Unstructured documents present a particular challenge to interoperability. While such documents may have an implicit structure, the current art is not able to identify and extract the relevant data that is required in order to transform the unstructured data into a different format.

A semi-structured document is a document that is mostly structured but has parts that are not well defined. An example is a Cobol message that has an associated copybook, where the copybook contains a "redefine". The presence of the unstructured regions within a semi-structured document may make the document difficult to transform to another format.

Additionally, organizations which rely upon computer systems, such as corporations for example, have increasing expectations that their computer systems should be able to communicate more flexibly and efficiently with each other. Background art describes how multiple computer systems should be able to communicate, in order to fulfill expectations of the organizations which operate them. A background art system may be divided into two sections: an internal section and an external section. Internal section typically resides within an organization, and includes one or more databases and internal application(s). Database(s) and internal application(s) in turn communicate through a combination of network hardware and one or more interfaces, which may be viewed as a local network interface.

On the other side, the external section may be outside the organization, or alternatively may represent another part of the organization. For example, an organization may have multiple branches, which may be connected through a WAN (wide area network) or other type of network connection. Also, the external section may represent a different type of computer system, such as a legacy system for example. If the external section is outside the organization, the external section may belong to an external supplier, such as for business to business (B2B) communication or for communication within organizations or companies. The external section also features one or more databases and external application(s). Database(s) and external application(s) in turn also communicate through an external network interface, which could also be the Internet for example.

In order for internal section and external section to communicate effectively, data and messages should be passed between them in a suitable data format. However, if different data formats are required, then some type of transformation process must be performed. Such a process can be thought of as a "black box" process, because there is currently no universal, broadly effective solution to the problem. For example, an organization could choose to implement a specific transformation solution, which would transform data in one type of format into another type of data format, and/or which would specifically permit two systems to understand different messaging formats.

One example of a black box solution which is available in the art is Mercator mapping tools (Mercator Software Inc., USA, acquired by Ascential™, now part of IBM®). This technology enables a programmer to create a specific transformation mechanism from one type of data, such as a proprietary format for example, to a second type of data, such as a commercial database format for example. However, it is limited to predefined, fixed transformations, such that each transformation mechanism between two different types of data requires the programmer to produce a separate transformation mechanism. Thus, this type of solution clearly has significant disadvantages. Additionally, Mercator uses a centralized broker configuration which has its own disadvantages, as it becomes a local point of failure, an administrative bottleneck and more.

There is thus a widely recognized need for, and it would be highly advantageous to have, a system and method for data format transformation devoid of the above limitations.

SUMMARY OF THE INVENTION

The background art does not teach or suggest a system or method for flexibly performing transformations between different data formats, which does not require multiple predetermined, fixed transformation mechanisms to be created.

The present invention also optionally and preferably allows defining the transformation between different data types by example, replacing the need to write code or procedurally describe the transformation. Creating a transformation requires only the ability to markup appropriate examples of the documents that need to be transformed, and indicating the final format for the data. Transformation by example has a number of advantages over the background art. It eliminates the need for a programmer, or a person with programming skills to create the transformation.

The background art does not allow documents of any type (structured, unstructured or semi-structured) to be transformed to any other type of document (structured, unstructured or semi-structured).

The background art also does not teach how to create such transformations by examples, or by leveraging meta-data representations (hereafter called meta-level transformation) of the document (e.g. documentation describing the line format of documents in a document set and their appropriate XML representation) thereby alleviating the need for programming the transformation. Meta-level transformation has great advantages when creating transformations for documents having structures described by external or internal standards (for example, ACORD) or other documentation, and allows the transformation system to track any changes in the document format by tracking the relevant documentation.

The background art also does not teach or suggest the embedability of the transformation, such that it can be embedded in any application or server.

The background art also does not teach or suggest such a system or method in which data filtering is combined with data transformations, such that the data is not only transparently transformed from one format to another, but is also filtered for communication between computers and/or computer systems, and/or storage systems. The background art also does not teach or suggest such a system or method which also provides routing of data and/or messages.

The document transformation system and method presented herein overcomes these disadvantages of the background art by providing a system and method for document transformation in which the document is transformed from one format to another via a central format. Preferred embodiments are presented for incorporating this transformation with distributed message transformation, and optionally message routing and/or filtering, in which the data of the message is transformed and/or analyzed according to content of the data. The present embodiments operate transparently with, and can be embedded in, the existing messaging infrastructure, such that preferably no changes are required to this infrastructure for the operation of the present embodiments. Distributed operation is preferably performed with a plurality of distributed modules according to the present embodiments. For example, a message transformation module (operating substantially as the transformation engine described below) may optionally be operative at the sending and/or receiving message application location, such as a sending and/or receiving computational device for example. The message transformation module would preferably be able to operate without requiring a central messaging broker. Optionally, the message transformation module would be capable of enabling messages to be transmitted through the central messaging broker.

Thus, in preferred embodiments the message is intercepted transparently from a messaging application. The messaging application may preferably be operated by, or embedded in, at least one of a sender or a receiver of the message, thereby obviating the need for a central messaging broker. In preferred embodiments of the present invention, there may be a central messaging broker. Even in preferred embodiments of the present invention in which there is a central messaging broker, the present embodiments may operate without a central messaging broker.

The present embodiments also optionally and preferably provide a system and a method for transforming data between different types of formats through a centralized mechanism. By "centralized mechanism", it is not required that the mechanism be physically or logically located in the center of data transmission streams, although optionally the system may be so implemented. Instead, the term "centralized mechanism" refers to the requirement that all data be transformed into a central format, and then into a second data format, rather than being transformed directly to the second data format from the first data format.

The use of a central data format has a number of advantages over the background art. For example, a data transformation mechanism is only required between a particular data format and the central data format. Therefore, if data is to be transformed between four different formats, only four transformation mechanisms are required according to the present embodiments. By contrast, for the background art, six such mechanisms would be required, in order to create a fixed data transformation mechanism between each pair of data formats.

Another advantage is that adding transformation capabilities for a new data format only requires one additional transformation mechanism to be created, rather than a plurality of such mechanisms. Continuing the previous example, adding a fifth data format would require four more transformation mechanisms to be created according to the background art.

The central data format also supports the optional but preferred embodiments of the present invention, which are more easily operated with the central data format. For example, in order to filter data, the preferred filtering embodiment according to the present invention is only required to be operable with the central data format, rather than with a plurality of original data formats. Filtering can therefore be performed more efficiently across a computer system and/or across an organization, and/or between organizations. For example, an organization may wish to implement a rule that transaction data having certain characteristics should be sent to only one department within that organization. These characteristics do not depend upon the application which produces the data, nor do they depend upon the format of that data. Thus, regardless of whether the data is produced by a legacy system or a commercial application, the data can be handled according to its characteristics.

Another optional but preferred embodiment of the present invention concerns routing. Routing may optionally include transmitting data to one or more locations within an organization, more preferably according to data content. A user may preferably define a field to be examined in the content, and when the content is determined to meet certain criteria with regard to this field, the corresponding messages can be routed to a particular department within an organization. Thus, this embodiment of the present invention enables data to be transmitted more effectively.

In preferred embodiments of the present invention, simple content based routing may preferably be performed in a sender API or any other available channel exit. Simple filtering functions may preferably be performed in a receiving API or any other available channel exit. The above-mentioned embodiments eliminate the need for routing with a message broker, for example when only data transformation (from one format to another) and simple routing are required. In preferred embodiments of the present invention, routing is optional and may optionally not be performed.

It should be noted, for the purposes of description only and without any intention of being limiting, that the term "message" is considered to be a subset of the term "data" unless otherwise noted.

Hereinafter, the term "network" refers to a connection between any two or more computational devices which permits the transmission of data.

Hereinafter, the terms "central router," "centralized mechanism," and "message broker" may be used interchangeably.

Hereinafter, the terms "message" and "document" may be used interchangeably.

Hereinafter, the term "computational device" includes, but is not limited to, personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: WebTV or other set-top boxes, interactive television, thin clients, laptops, hand-held computers, PDA (personal data assistant) devices, cellular telephones, any type of WAP (wireless application protocol) enabled device, wearable computers of any sort, or any other type of device which can be connected to a network as previously defined and which has an operating system.

For the present embodiment, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++, ASP and Java.

In addition, the present embodiments could be implemented as software, firmware or hardware, or as a combination thereof. For any of these implementations, the functional steps performed by the method could be described as a plurality of instructions performed by a data processor.

Throughout the present specification the same reference numbers may be used to denote similar components which appear in different diagrams.

According to a first aspect of the present invention there is provided a method for defining a document format transformation process for documents similar to an example document. First, an example document is provided in a first format. Then, at least one anchor point is specified within the example document. The anchor point is usable to mark out regions of data within the example document. Finally, a position in a central format is defined, for respective ones of the regions, into which data of the region is to be transferred. The method enables transforming documents similar to the example document into the central format.

According to a second aspect of the present invention there is provided a system for defining a document format transformation process for documents similar to an example document. The system includes a document markup unit and a transformation generator. The document markup unit is for specifying at least one anchor point within an example document, where an anchor point is usable to mark out regions of data within the example document. The transformation generator is for defining, for respective ones of the regions, a position in a central format into which data of the region is to be transferred. The system enables defining a transformation process to transform documents similar to the example document into the central format.

The present invention successfully addresses the shortcomings of the presently known configurations by providing a system and method for data format transformation capable of transforming structured, unstructured, and semi-structured documents to and from a central, structured format.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1e is a schematic block diagram of a background art system;

DESCRIPTION OF THE PREFERRED EMBODIMENTS

Figure 1A:
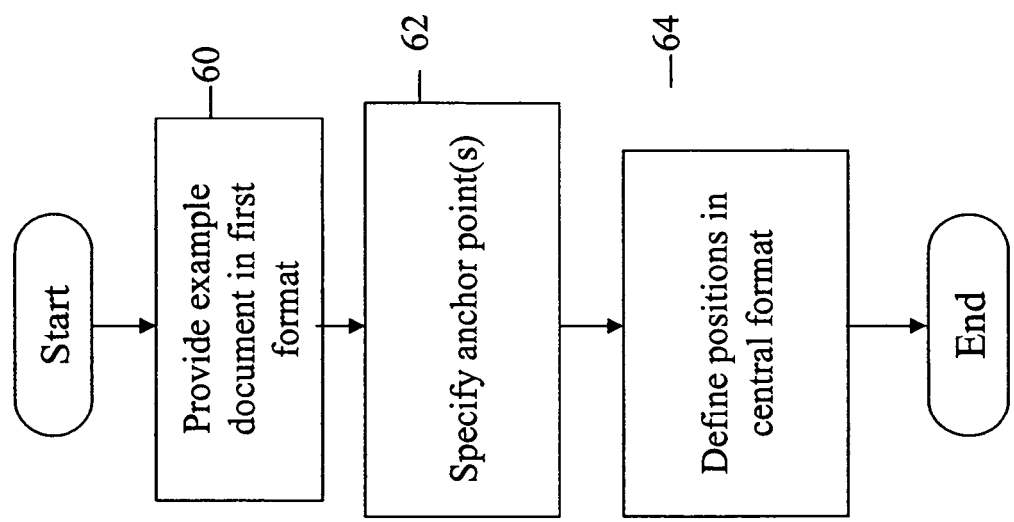
FIG. 1a is a simplified flowchart of a method for defining a document format transformation process, according to a preferred embodiment of the present invention.

The present invention is of a system and method for data format transformation which can be used to transform a document from one format to another, by first transforming the document to a central format and then from the central format to the desired format. Specifically, the present invention can be used to perform such a transformation for unstructured documents, which do not have a well-defined, easily parsed structure. As discussed in more detail below, the transformation is preferably created by example, that is by marking up an example document or a documentation specification (meta-level transformation).

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present embodiments preferably also provide a system and method for distributed message transformation, having the transformation engine directly operated by or embedded in other systems and/or optionally message routing and/or filtering, in which the data of the message is transformed and/or analyzed according to content of the data. The present embodiments operate transparently with the existing messaging infrastructure, such that preferably no changes are required to this infrastructure for the operation of the present embodiments. Distributed operation is preferably performed with a plurality of distributed modules according to the present embodiments. For example, a message transformation module may optionally be operative at the sending and/or receiving message application location, such as a sending and/or receiving computational device for example. The message transformation module would preferably be able to operate without requiring a central messaging broker. Optionally, the message transformation module would be capable of enabling messages to be transmitted through the central messaging broker.

Reference is now made to FIG. 1*a*, which is a simplified flowchart of a method for defining a document format transformation process, according to a preferred embodiment of the present invention. The document transformation process is defined on a "by example" basis. The user marks up an example document, in a first format (also denoted herein a source format). The marked up example document is used to develop a general transformation process, so that the resulting transformation process is capable of transforming similar documents into the desired format. It is assumed that the unstructured document has an implicit structure, so that the anchors marked in the example document are locatable within similarly formatted documents.

In step 60, the example document is provided. The example document is in a first format. In step 62, the user specifies one or more anchor points within the example document. The anchor points serve to demarcate regions of data within the example document. If a given anchor point is located in a document, any associated demarcated region can be located therefrom. Finally, in step 64, a corresponding position in a central format is defined for each of the demarcated regions. Transforming a given document into the central format is then performed by extracting data from each region, and transferring the data into the corresponding positions in the central format. The extracted data may optionally be changed prior to being transferred to the central format. For example, the value of the extracted data may be looked up in a look-up table, and the value found in the look-up table is inserted into the central format.

The transformation process may be content dependent. After extraction from the original document, data may be analyzed to determine how the transformation process should proceed.

The central format is a predefined format, which is not derived from the input documents. The centralized format is defined according to any standard known in the art, preferably as XML or an XSD. However other standards, such as ACORD or a user's internal standard may be used. Although optionally any type of central data format may be used, the present embodiments are preferably used with XML or related computer languages thereof XML is preferred because it has a highly flexible format, which is suitable for all types of data, including but not limited to, unstructured data such as textual documents for example, or structured data such as relational database data for example. XML features a plurality of tags, and can receive data as a plurality of items, each of which is described or labeled with a tag.

The manner in which the position of an anchor within the example document is specified by the user, is preferably by one of the following:

a) The absolute location of the anchor point in the document b) A location relative to another anchor point in the document c) A defined place within the structure of the document d) In relation to certain document content However, other ways of specifying an anchor location within a document are possible, and are not limited to the above.

Through the anchor mechanism it is possible to allow users to mark up unstructured example documents, in order to describe how an unstructured document is to be transformed to a structured set of data. These anchors enable the transformation process to derive the implicit structure of a set of documents even though there may be variability between the documents.

These anchors may optionally be determined according to such features of the document as text strings, images and other information. In a preferred embodiment, an anchor point has one or more attributes which define how the operations to be performed upon associated regions of data. Anchors are optionally and preferably of two types: marker and content anchors. Marker anchors are primarily used to determine the location of data within the document, in order for the transformation engine to be oriented correctly on the document. Content anchors may provide orientation information with regard to the location on the document, but these anchors are primarily intended to indicate the presence of information on the document which should be extracted.

Preferably, the order in which the anchor points are searched for within the document is defined by the transformation process. For example, a first, easily locatable anchor may be found, and then other anchors can be determined by their relative position to the first anchor point. In the context of anchor attributes, the transformation may first search for a marker anchor, and then find a content anchor at a relative location. In this example, data is extracted from the document only at the location of the content anchor.

Figures 1B, 1C:
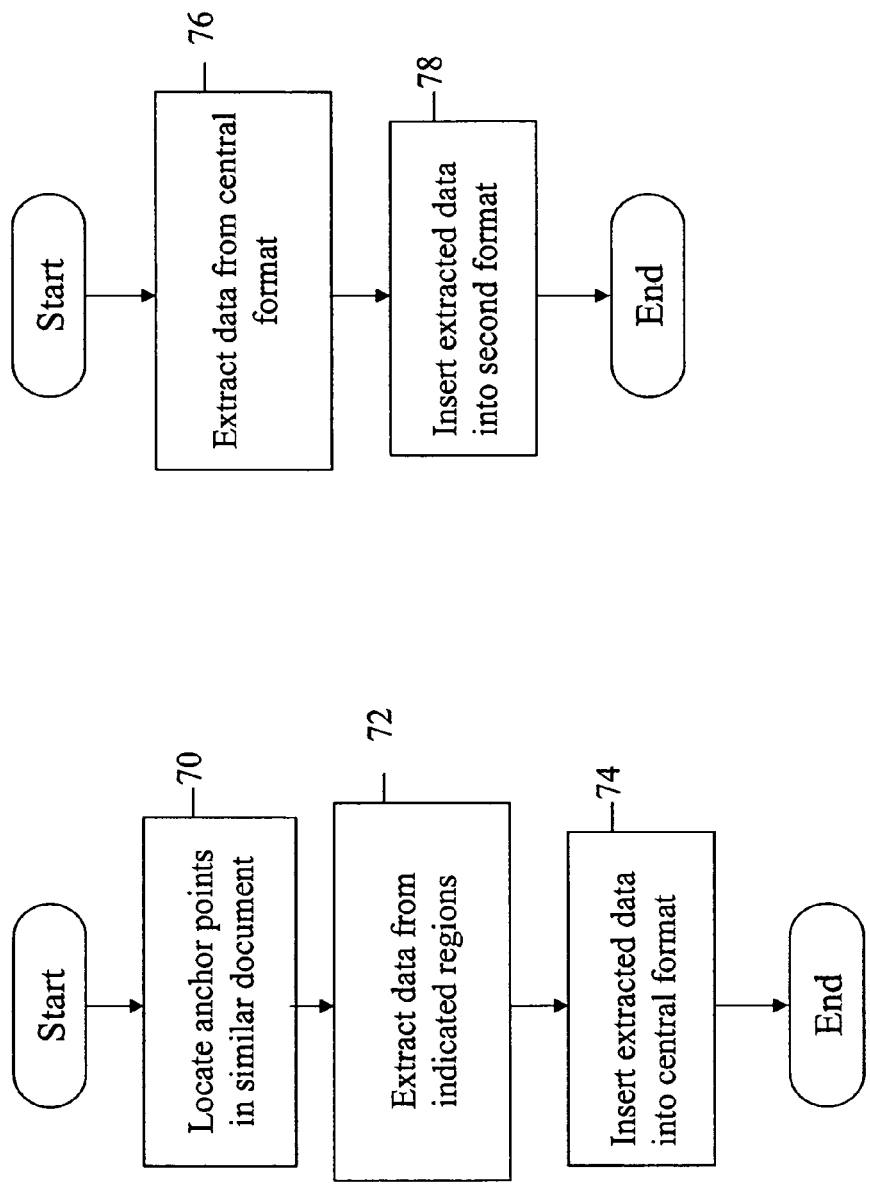
FIG. 1b is a simplified flowchart for a method for transforming a document based on a defined transformation process, according to a preferred embodiment of the present invention.
FIG. 1c is a simplified flowchart for a method for translating a document from the central format into the target format, according to a preferred embodiment of the present invention.

After the transformation process is defined, the process may be used to perform actual document transformations. Reference is now made to FIG. 1b, which is a simplified flowchart for a method for transforming a document based on a defined transformation process, according to a preferred embodiment of the present invention. In step 70, an original document similar to the example document (i.e. having the same format as the example document) is examined to locate the anchor points. In step 72, data is extracted from regions indicated by the located anchor points. This data may be of any type which is extractable from the document, for example text or numerical data. The extracted data is then inserted into the corresponding positions in the central format in step 74, to provide a transformed document in the central format. Preferably, the method includes the further step of converting extracted data into a different representation prior to its insertion into the central format (for example to convert numerical data into a string). The required conversion may be incorporated into the defined transformation process.

An example of the way anchors are defined within a document, and the way anchors are used for data extraction from a document is now presented. Document transformation is performed by searching for the anchors in the original document and by running the operations that the user has configured the anchors to perform. In the present example, the anchors used are of two types, Marker and Content anchors. These anchors are often used as a pair: a Marker anchor labels a location in a document, and a Content anchor retrieves text from the location. To understand these anchors, imagine a printed questionnaire. The first line typically asks for the person's last name and first name, with each label followed by a blank space to receive the information. In the context of the present embodiment, the printed labels "Last Name" and "First Name" are Marker anchors, and the blank spaces are Content anchors. The anchors provide a means to home in on the data, for the purpose of extracting it from the source document.

Other anchor types are possible. For example, Group and Repeating Group anchors may be used to specify the organization of the data fields. An Alternatives anchor may specify multiple types of data that might occur at a particular location in a source document. The transformation engine learns how to extract data from the document by examining the anchors and the delimiters that separate them.

For example, suppose that a document uses a tab-delimited format. Given the example text:

First name:<tab>Ron where <tab> is a tab character.

The user can define First name: as a Marker anchor, and Ron as a Content anchor. The defined transformation will search a source document for the string First name: It will then skip over a single tab delimiter and retrieve the text that follows the tab.

Suppose the user runs the transformation on another source document, which contains the following text:

First name:<tab>Jack

The transformation engine finds the anchors as above and retrieves the text Jack.

Now suppose that the source document reads:

First name:<tab>Jack<tab>Age:<tab>34

The transformation engine still retrieves the text Jack, rather than Jack<tab>Age<tab>34. This works because the tab character is defined as a delimiter. The transformation engine understands that the Content anchor starts after the first tab and ends before the second tab. It is possible to define additional anchors that retrieve Jack's age, which is 34.

A Content anchor causes text extracted from a source document to be stored in a data holder. For example, a Content anchor may be configured to store its results in an XML element called FirstName. If the Content anchor retrieves the text Jack, the transformation engine would produce the following output:

<FirstName>Jack</FirstName>

More precisely, the user might specify that the anchor should store the retrieved text at the path /Person/*s/FirstName, which refers to an XSD schema. The actual transformation engine output would be:

<Person>
<FirstName>Jack</FirstName>
</Person>

On the other hand, suppose that the XSD schema defines FirstName as an attribute of the Person element. The user might map the Content anchor to /Person/@FirstName. The output would be:

<Person FirstName="Jack"/>

An anchor may be mapped to a data holder that is an XML element, an XML attribute, or a variable. The variable option is useful if the data is used in a subsequent processing step, but the user does not want the raw data to be included in the transformation engine output.

In the preferred embodiment, a transformation program is generated for the transformation process, which is used to automatically transform documents from the source format into the central format. The transformation program may be in the form of a script or macro.

In the preferred embodiment, the central format is an intermediate format which is used to enable easy transformation of documents to and from several formats. In order to transform a document from a source format to a target format, the document is first transformed into the central format, and from the central format into the target format. Thus a transformation process need be defined for each given format to and from the central format. Once defined, a document may be transformed from any one of the formats into any target format, without defining a specific transformation from the source format into the target format.

For clarity, the following description uses the term "translation" to indicate a transformation from the central format into a second, target format. It is noted that the translation process is essentially equivalent to the transformation process, and that the terms may be used interchangeably.

Preferably, the method includes the further step of defining a translation process for transforming the central format into a second document in a second format (also denoted herein a target format). Since the structure of the central format is well defined, the location of the data to be placed in the second format is known. The translation process is defined by associating specified positions in the central format with respective regions of the second format. Like the transformation process, the translation process may be content-dependent.

After the translation process is defined, the process may be used to generate a document in the target format. Reference is now made to FIG. 1c, which is a simplified flowchart for a method for translating a document from the central format into the target format, according to a preferred embodiment of the present invention. In step 76, data is extracted from the central format, and in step 78 the data extracted in step 76 is inserted into the corresponding locations in a second format, to generate a final document.

Thus, once the transformation and translation processes are defined, a document may be converted from a source format to a target format by performing steps 70 to 78 in sequence.

The abovedescribed methods are suitable for all types of documents having an implicit structure, whether structured, unstructured, or semi-structured. The present embodiments are thus seen to provide an "any-to-any" transformation mechanism, in which the format of the source document may be structured, unstructured, or semi-structured, and the format of the target document may also be structured, unstructured, or semi-structured. Preferably, the central format is a structured format, to simplify the transformation and translation processes.

Preferably, the original document is one of: an Adobe® PDF document, a Microsoft® Word document, a hypertext markup language (HTML) document, a Microsoft® Excel document, a word processor document, a web page, or a spreadsheet document. Preferably, the final document (in the second format) is one of: an Adobe® PDF document, a Microsoft® Word document, a hypertext markup language (HTML) document, a Microsoft® Excel document, a word processor document, a web page, or a spreadsheet document. However, other document types are possible for both original and final documents, including proprietary formats.

In the preferred embodiment, the example document used to define the transformation process is a specification document describing a plurality of document formats. The specification document may be for documents in one of the following types: Adobe® PDF, Microsoft® Word, a hypertext markup language (HTML) document, Microsoft® Excel, a word processor document, a web page, or a spreadsheet document. However, other document types are possible, including proprietary formats.

Preferably, a respective transformation is defined for each format described by the specification document. The respective transformation process is the process which transforms a document from the given format into the central format. In this way a library of transformations is created, with each document type having its own transformation. Preferably, respective translation processes are also defined, to translate a document back from the central format into the given format.

In the preferred embodiment, when a document is received, the format of the received document is first determined and the appropriate transformation process is selected. The received document is then transformed into the central format using the selected transformation process.

An example of the meta-transformation process is presented below. Meta-level transformation is a process which builds a library of transformations based on a document format specification. Meta-level transformation uses any-to-any document transformation capabilities and transformation-by-example (discussed above) to a build a library of data transformations that can be used to create the transformations needed to transform an industry standard message to any proprietary internal format. Meta-level transformation is used to build and maintain standard messaging libraries such as the HL7, HIPAA, EDIFACT, SWIFT and EDI-X12 libraries.

The input of the meta-level procedure is the document specification. For example, the specification might be a Microsoft Word document or an Excel document. For each document specified by the specification document, the output of the meta-level procedure is a pair of executable transformations one defining the transformation of an original document to the central format, the second defining the translation from the central format back to the source format, along with the schema describing the structure of the document data.

The meta-level transformation process consists of creating a transformation engine capable of converting the messaging specification to an intermediate XML representation and a set of three serializers which construct the output TGP files and the output XSD file, respectively. The serializers are the components that generate the transformation/translation processes, by creating two executable scripts and a target XSD. The first executable script takes a specified message and transforms the message into an XML document that conforms to the target XSD. The second script generates a legal message from an XML instantiation of the target XSD. The intermediate XML representation is a simple one-to-one schema definition of the document type.

As an example of the meta-level approach, consider a messaging protocol described in a Word document, or Excel spreadsheet in which each message type contains a fixed-length text record. The protocol specifies the name and width (number of characters) of each field within the record. This is called a positional format because the fields are located at fixed positions within the record.

One of the message types might be called Family, and have the following structure:

| Field name   | Width |
|--------------|-------|
| Father_name  | 10    |
| Mother_name  | 10    |
| Address      | 20    |
| Child_name   | 10    |

We assume that the protocol defines many message types, containing different types of data. The field names and widths differ among the message types, which conform to the above positional format.

The first step is to construct an intermediate XML representation of each message type and to parse the messaging specification into that structure. For the Family message, the intermediate XML would have the following structure:

```
<MessageTypeDefinition message_name="Family">
    <Field field_name="Father_name" width="10" />
    <Field field_name="Mother_name" width="10" />
    <Field field_name="Address" width="20" />
    <Field field_name="Child_name" width="10" />
</MessageTypeDefinition>
``` which conforms to the following XSD schema:

```
<?xml version="1.0" encoding="utf-8"?>
<xs:schema xmlns:xs="http://www.w3.org/2001/XMLSchema">
```

-continued

```
<xs:element name="MessageTypeDefinition">
    <xs:complexType>
        <xs:sequence>
            <xs:element maxOccurs="unbounded" name="Field">
                <xs:complexType>
                    <xs:attribute name="field_name" />
                    <xs:attribute name="width" />
                </xs:complexType>
            </xs:element>
        </xs:sequence>
        <xs:attribute name="message_name" />
    </xs:complexType>
</xs:element>
</xs:schema>
```

The next step is to create a transformation that takes the unstructured specification document and transforms it to an intermediate XML document. The intermediate XML document has a structure which is a simple schema that represents the document. A transformation process is created which can transform the specification document into the intermediate XML representation. Then three transformations from the intermediate XML representation are defined to create two executable scripts and a target XSD. The first executable script transforms a specified message into XML conforming to the target XSD. The second executable script transforms an XML instantiation of the target XSD into a legal message. The three transformations are the output of the meta-level process and describe how to turn each message described in the specification into an executable transformation.

Preferably, the method comprises the further step of embedding a transformation engine into another system or application. The embedded transformation engine transforms documents to and/or from the central format. With an embedded transformation engine, centralized processing of the documents is not required.

When using an embedded transformation engine, the calling environment sets up the environment for the transformation engine. The engine receives an input original document, executes the transformation process (e.g. script) and then generates a final document. Being embedded means that the environment that invokes the engine can assume that it is a well-behaved process that can be invoked with no harmful side effects. The environment provided by the invoking process provides mechanisms such as, but not limited to, thread pool management, message priority, health and event monitoring framework, error management framework, and persistent store. The engine is also respectful of the invoking environment and careful not to take any actions that have a detrimental effect on the invoking environment. This includes but is not limited to not overwriting files, and allowing for engine startup at the same time as environment startup (parameter based).

The abovedescribed document transformation process is preferably integrated into a messaging environment. A detailed example of a transformation/messaging system is presented below. In the preferred embodiment, an original document in a first format is obtained from a source, preferably by intercepting a message from a messaging application. The obtained document is transformed into the central format at the source. The transformed document is then serialized if necessary, and transferred as a message from the source to a destination. The message is received at the destination and translated into the target format. In such a system, there is no need for centralized message processing for either messaging or format translation.

Preferably, the message is routed from the source to the destination in accordance with document content.

Preferably, the data in the transformed document is filtered according to at least one specified characteristic of the data.

Figure 1D:
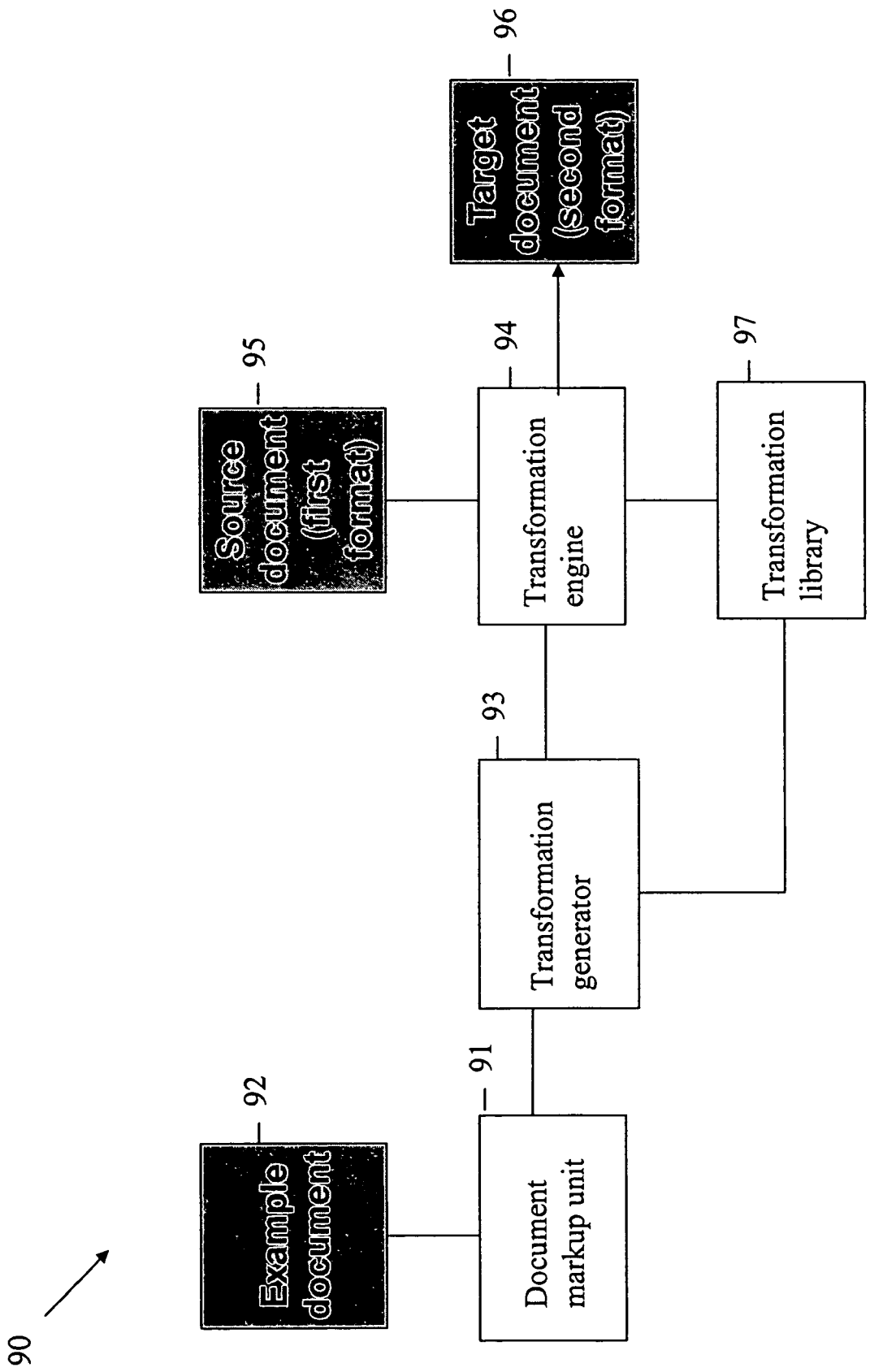
FIG. 1d is a simplified block diagram of a system for defining a document format transformation process, according to a preferred embodiment of the present invention.

Reference is now made to FIG. 1d, which is a simplified block diagram of a system for defining a document format transformation process, according to a preferred embodiment of the present invention. System 90 contains a document markup unit 91 and a transformation generator 93. Document markup unit 91 provides a user interface for specifying at least one anchor point within example document 92. As discussed above, the anchor point(s) mark out regions of data within the example document.

Transformation generator 93 is used to define respective positions for some or all of the demarcated, indicating the region in the central format into which the data extracted from the region is to be transferred. Transformation generator 93 preferably also generates a script or program to perform the transformation on a document. Non-limiting examples of central formats are XML and XSD.

In the preferred embodiment, transformation generator 93 is further configured to be used to define a translation from the central format to a target format.

In the preferred embodiment, system 90 further comprises transformation engine 94, which performs the transformation process defined by transformation generator 93 on source document 95 (in the first format). Transformation engine 94 preferably also translates the resulting document in the central format into target document 96 in the second format, in accordance with a defined translation process provided by transformation generator 93.

Preferably, source document 95 is a message obtained from a messaging application. Source document 95 may be transformed into a central format and then sent as a message to a destination, where it is translated into the second, target format.

Transformation generator 93 is capable of defining transformations for structured, unstructured, and semi-structured documents, into a central, structured format. Likewise, transformation generator 93 is capable of defining translations from the central format into a structured, unstructured, and semi-structured document. System 90 is thus seen to have the capability to perform any-to-any transformation, as defined above.

In the preferred embodiment, example document 92 used to define the transformation process is a specification document describing multiple document formats (i.e. meta-transformation). Transformation generator 93 preferably generates a respective transformation for each format. The transformations are preferably stored in transformation library 97, to be retrieved by transformation engine 94 when a source document in a given format is received. The format of the received document may be specified with the document, or may be determined from the document by transformation engine 94. The transformations stored in transformation library 97 are not necessarily obtained by meta-transformation.

Preferably, the stored transformations/translations are alternately or additionally defined individually from single-format example documents.

In the preferred embodiment, the user may optionally define portions of the transformation manually, for example by rescripting portions of the transformation script. The user is therefore able to incorporate knowledge of a given format obtained by a manual analysis of an example or specification document.

Following is a detailed description of a preferred embodiment of the above described system and method for document format translation, within the context of a messaging system.

Thus, in preferred embodiments the message is intercepted transparently from a messaging application. The messaging application may preferably be operated by at least one of a sender or a receiver of the message, thereby obviating the need for a central messaging broker. In preferred embodiments of the present invention, there may be a central messaging broker. Even in preferred embodiments of the present invention in which there is a central messaging broker, the system may operate without a central messaging broker.

According to a preferred embodiment of the present invention, the central transformation mechanism is implemented according to a physically and/or logically distributed architecture. Preferably, each application which is being operated by a computational device has its own embedded transformation mechanism, which is associated with that application. For example, a legacy system application would optionally have its own transformation mechanism, which is preferably located at the same computational device or plurality of devices as the legacy system application. This embodiment has the advantage of lacking a single point of failure, and also of avoiding problems of load balancing because transformation is being done locally and not at a central location. However, it has the disadvantage of increasing the computational load on the device which is operating both the application and the transformation mechanism. There is more of a computational load because the computational device is running both the application and the transformation mechanism. This disadvantage may optionally be ameliorated by preferably causing the transformation mechanism to intercept data for transformation as the first stage in the process of receiving data for the application, and/or to intercept data as the last stage in the process. Preferably, both types of interceptions are performed. This type of structure enables the transformation mechanism according to the present embodiment to receive data, optionally without requiring the original application itself to be altered.

The distributed architecture described above ensures that if there is a failure at one point in the system, the computational load can be redirected to servers which are still operational, and if no additional servers are available to take on the additional load, the effect of the failure will be localized to the point of failure, and will not affect all applications and application traffic.

For the purposes of description only and without any intention of being limiting, a collection of data which is to be transformed into a different format which is a particular instance or group of data, is termed a message. The message may comprise a document, a record (a collection of fields), or a set of documents or records.

According to the present example, information about the data, such as one or more characteristics for example, is preferably automatically extracted according to a pattern. The present embodiment may optionally "learn" a pattern for extracting such information from an example data format. Alternatively, a human operator may optionally manually create the pattern by a manual analysis of the message document or a document describing the data format, as described above. The present embodiment preferably features a parser (comparable to system 90 of FIG. 1d) for learning, or being taught, each pattern as described in greater detail below. The learned pattern is then optionally and preferably applied to other types of documents having the same or similar structure, or can be used to create the learned pattern for a document type described by the ingested documentation. The content is then preferably extracted from the document. The extracted content is preferably analyzed according to entities, or items within the data of the document, and their attributes. Collectively, the content of the entities and the attributes form characteristics of the data.

According to the preferred embodiment, the pattern is organized according to a plurality of anchors, which are optionally and more preferably of two types: marker and content anchors. Marker anchors are primarily used to determine the location of data within the document, in order for the parser to be oriented correctly on the document. Content anchors may also optionally provide orientation information with regard to the location on the document, but these anchors are preferably primarily intended to indicate the presence of information on the document which should be extracted. These anchors may optionally be determined according to such features of the document as text strings, images and other information.

More preferably, the order in which the parser searches for the anchors within the document is flexibly determined. For example, the parser may optionally be instructed to first search for certain anchors within the document, as these anchors are more easily located, and to search for any other anchors only after these particular anchors have been found.

In optional but preferred embodiments of the present invention, the preferred filtering embodiment is only required to be operable with the central data format, rather than with a plurality of original data formats. Filtering can therefore be performed more efficiently across a computer system and/or across an organization, and/or between organizations. For example, an organization may wish to implement a rule that transaction data having certain characteristics should be sent to only one department within that organization. These characteristics do not depend upon the application which produces the data, nor do they depend upon the format of that data. Thus, regardless of whether the data is produced by a legacy system or a commercial application, the data can be handled according to its characteristics.

Data filtering is also optionally and more preferably performed with XML as the central data format. Although optionally any type of data format may also be used for filtering, XML is preferred because it also preserves the characteristics of the data, including but not limited to the actual content of the data.

Another optional but preferred embodiment of the present embodiment concerns routing. Routing may optionally include transmitting data to one or more locations within an organization, more preferably according to data content. Thus, the present embodiment enables data to be transmitted more effectively.

In preferred embodiments of the present invention, simple content based routing may preferably be performed in a sender API and simple filtering functions may preferably be performed in a receiving API.

In optional embodiments of the present invention, a message broker (also known as a central router), which decides where the managed messages go, and routes these managed messages accordingly, may be included in the system architecture.

However, in preferred embodiments of the present invention a message broker is not needed. In other alternative preferred embodiments of the present invention, the message broker may not be utilized even if it is a part of the messaging system's physical infrastructure.

The present embodiment performs transformations into different formats according to content. The methodology of the present embodiment is distinct over transformation systems known in the art that do not perform transformations according to content, but according to data characteristics such as low level transformations from Unix to Microsoft Windows™ or transformation mechanisms that will transform ASCII code to another format.

Preferred embodiments of the present invention include software which comprises a distributed routing and filtering mechanism. Distributed routing and filtering may be implemented by one mechanism or two separate mechanisms, a first mechanism for distributed routing, and a second mechanism for filtering. The distributed routing and filtering mechanism(s) may preferably operate according to analysis of content, and will work with/or without a central router/message broker.

Preferred embodiments of the present invention may preferably comprise a distributed transformation mechanism, which may preferably be implemented through software applications, for transforming data into different formats according to content. The transformation mechanism may preferably act upon data at the sender and/or receiver, and is capable of operating with or without a message broker, using messaging infrastructure. The transformation mechanism preferably transforms content to and from a central format, for example XML.

In preferred embodiments of the present invention, a unique messaging mechanism is utilized in conjunction with the transformation mechanism.

For those customers that do not want to implement a message broker solution, either because of high costs, or because of architectural limitations (single point of failure, high overhead, etc.), an embedded transformation module may preferably provide a non-intrusive, simple, and elegant solution for message transformation and routing.

The transformation module preferably implements the unique messaging mechanism solution by allowing users to handle data transformation, simple content based routing, and content based filtering directly and transparently as data moves between the application and the message bus.

The unique messaging mechanism preferably comprises a mechanism in which a message is delivered, and in which the message "knows" how to transform and route itself, using basic messaging capabilities and basic messaging infrastructure, without the need for a message broker.

The present embodiment, which may optionally be implemented at the messaging middleware level in alternative preferred embodiments, allows customers to directly and immediately transform data at the source from any format to any other format, thus enabling every application to send and accept data in its preferred format.

The unique messaging mechanism optionally and preferably extends Message Buses by being transparently embedded into standard messaging platforms (such as IBM WebSphere MQ, JMS and others). The unique messaging mechanism preferably enhances the messaging technology by performing data transformation directly and transparently as data moves between the application and the message bus.

When a message is sent via the messaging APIs, the unique messaging mechanism optionally and preferably transparently transforms the content of the message to XML on the origin side, and then back from XML to the receiving format, on the destination side (using a transformation module as the core component).

The unique messaging mechanism can also optionally and preferably perform simple content based routing in the sender API and simple filtering functions in the receiving API. This technology eliminates the need for Message Broker in the less complicated cases where only transformation and simple routing is required.

The unique messaging mechanism integration can optionally and preferably be implemented in several ways, two of which are described below (depending on the middleware and/or messaging system technology, and possibly varying based on the availability of a direct API exit point or other interface means).

If there is a direct exit point in the underlying messaging system, the unique messaging mechanism may preferably be implemented to extract the message data at the exit point. An exit point is defined as a predefined interface to a defined application (a product with a "closed" specification for processing such that data can only enter and/or exit the process(es) performed by the product at predetermined points) at a predefined point that allows additional user defined processing to occur within the flow of the defined application. At the sending computational device, the message is preferably transparently intercepted. A call is directly made to the unique messaging mechanism from the exit point. The message is preferably transformed to XML (or to the desired central format), and optionally and more preferably is returned for further processing and routing. At the receiving computational device, the message is also preferably transparently intercepted and the reverse process occurs in which data is preferably transformed from XML (or any other desired format) to the format which is usable at the destination. Additionally, at the receiving computational device, the message can be filtered so only part of the message will be received by the application.

For those underlying messaging systems that do not offer an exit point, the unique messaging mechanism may preferably be implemented as a DLL replacement library. In this case, the unique messaging mechanism becomes a "viral front end" to the API. A call is made to the unique messaging mechanism to transform the data, and then the sending computational device calls MQ Queue to process the actual queue handling. At the receiving computational device, the reverse happens. MQ Queue processes the actual queue handling according to the instructions given by the human operator during the development process.

This solution, preferably implemented at the messaging middleware level (e.g. at the underlying messaging system) allows customers to directly and immediately transform data at the source from any format to any other format, thus enabling every application to accept data in its preferred format.

The transformation module used in preferred embodiments of the present invention may preferably be the ContentMaster™ of Itemfield Ltd. (Israel), which is based on proprietary transforming-by-example methodology that allows a non-programmer to generate XML output from any unstructured, semi-structured, or structured files, records, or messages, such as reports, documents, HTML pages, text forms, etc. In addition ContentMaster™ can also handle "traditional" adapter transformation tasks with support in industry standards such as: Electronic Data Interchange (EDI), typically used for communication between trading partners; HL7 Standard (healthcare standard for communication within the healthcare industry, such as for healthcare providers, hospitals, clinics and so forth); FIX Standard (standard for communication within systems for financial institutions), and so forth.

Adapters preferably comprise a combination of design tools and runtime software that act as a connection to link applications into the integration middleware that transports, transforms, and routes data between systems. The transformation module combines a visual, non-coding interface that is highly intuitive, easy to learn and use, with a scalable, high-speed transformation engine. This engine bi-directionally transforms data quickly and seamlessly—in real-time— from any source on any platform and format to any other. This is achieved with no programming, even for the most complex, proprietary and unstructured data source.

In preferred embodiments of the present invention, the transformation module is implemented in an enterprise network which manipulates enterprise data. Within an enterprise network, there is an integration of disparate networks, interfaces and systems.

Enterprise systems are utilized for the maintenance of legacy (multi-version) systems in traditional languages while developing new versions of legacy systems in newer languages and tools for the client/server environment. Enterprise systems comprise program modules and ancillary files that make up an application which must always be tracked when several programmers work on a project.

The transformation module's 'transforming-by-example' technology reduces development time from weeks or months to hours. Its iterative QA environment allows users to rapidly detect, fix, test and employ new transformation processes, thereby drastically reducing the maintenance cycle cost and duration. It extends the reach of applications to encompass all of a company's precious enterprise data assets, without requiring any changes to the applications themselves. It includes a powerful Meta parser, capable of reading COBOL copybooks, internal specifications documents and such, and creates the transformation module's transformations automatically. The Meta parser is a parser that parses data specifications instead of standard documents and preferably creates a parser for the data itself. The meta-parser may preferably be enabled to learn format structure from a given format specification and build a parser which is enabled to parse the given format.

The transformation module also maintains a global repository of all data mappings for all formats within the enterprise system, supporting a distributed multi-user environment. A transformation path and all its versions are kept, including the source format example instance, which is the example from which the parser "learned" how to parse a certain type of data. The transformation path chronicles the source format example instance's transformation to XSD, XSD to XSD, and the transformation to the destination format (XSD is a non-limiting example of a XML schema).

The transformation module for Super Adapter Toolkit is a technology designed to significantly accelerate adapter development process. It allows customers to transparently and seamlessly perform data transformation inside an Application Server or Information Broker process flow or stand alone next to any application.

The optional (but not preferred) message broker may optionally comprise an information broker, which is well known in the art and which can be used for any type of file trading.

The transformation module's integration is preferably achieved by wrapping the transformation module's transformation engine as a plug-in component for application servers and information brokers.

In preferred embodiments of the present invention, the transformation module is optionally provided as a re-entrant shared library (DLL) that can be called to parse any data source to and from XML. The transformation engine uses transformation scripts, which were generated visually in a transformation design environment.

There are three optional but preferred implementation techniques for using the transformation module's functionality, stand-alone parser, active embedded node, and embedded (added) parser as described below.

In the stand-alone parser configuration, the end user embeds the transformation module directly within the application of the user using the toolkit to develop and deploy their own transformation and transformation solution. In preferred embodiments of the present invention, the user can preferably embed the transformation module in the user's proprietary application, for example to transform and optionally store documents in XML and/or to manipulate documents in the XML format.

In the embedded mode, the transformation module preferably provides a stand-alone plug-in node that can be inserted by the user into the application server or information broker process flow at the point where transformation is needed. A preferred implementation would comprise the unique messaging mechanism plugged into WebSphere MQ™. In this case the call to the function is controlled directly by the schema builder, which builds schemas, definitions of entire databases, which define the structure and the type of contents that each data element within the database can contain. Schemas can preferably be generated by the transformation module without code and are preferably utilized in the transformation of data.

In the embedded (added) parser configuration, the transformation module provides a parser that is installed by the system administrator. The user then configures which parser should be activated for which application and queue, for example through the ContentMaster™ Visual environment. The parser is then preferably called automatically whenever a reference to an element that requires transformation occurs. In this case the call is passive.

Overall, the user is preferably able to define a parser, optionally through the transformation module, such as ContentMaster™ for example, and then to configure it to be active for specific applications. The configuration selected may optionally depend upon the type of application that is to communicate with the parser. For example, for applications such as WebSphere MQ 5.3™ and higher versions having similar functionality, the parser preferably communicates with the application by using the exit points. For applications such as versions of WebSphere MQ™ that are prior to 5.3, the original MQGet/MQPut function is preferably replaced with one or more DLLs (dynamic linked libraries) to enable the transformation module to be called. This method is described in greater detail below. The selection of a particular method depends upon whether the application provides a pre-existing function to enable access to the data.

Before describing the present embodiments, it is useful to note the required messaging components of a typical background art messaging system. Reference is now made to FIG. 1e, which is a schematic block diagram of a background art system 1, which features a first messaging application 5, a messaging infrastructure 10, and a second messaging application 15. Messaging infrastructure 10 may further comprise a message broker 20. Message broker 20 is a server which routes messages. Message broker 20 examines an incoming message and based on the analysis of the incoming message, message broker 20 routes the message to the appropriate location. In background art system 1, message broker 10 routes messages back and forth between first messaging application 5 and second messaging application 15.

The message broker 20 may comprise a central message broker. Having central message broker 20 in background art system 1 can be disadvantageous because a central message broker acts as a single point of failure. Yet, many such background art systems require the presence of central message broker 20 in order to operate. Thus, these background art systems suffer from a clear disadvantage because of this requirement.

The present embodiment overcomes this disadvantage, as well as many others, as described in greater detail below. Furthermore, the present embodiment is also operative with the components of such background art systems, such that existing messaging infrastructure does not need to be completely changed in order for the present embodiment to be operative. The principles and operation of the present embodiment may be better understood with reference to the drawings and the accompanying description.

Figure 2:
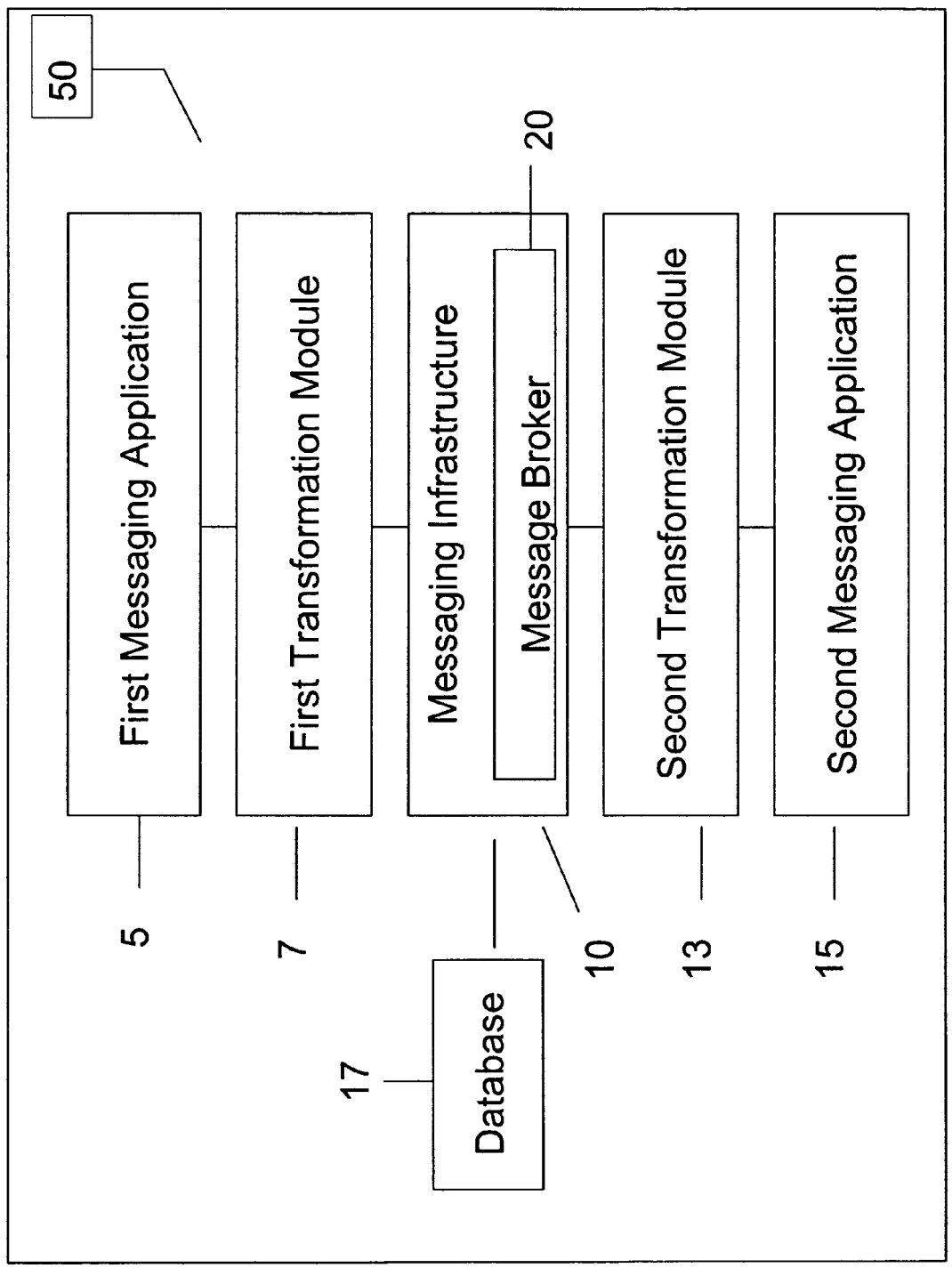
FIG. 2 is a schematic block diagram of an exemplary system according to a preferred embodiment of the present invention.

Reference is now made to FIG. 2, which is a schematic block diagram of an exemplary system 50 according to a preferred embodiment of the present invention. As shown, exemplary system 50 features some of the same components as background art system 1. Similar or identical components are indicated with the same reference numbers throughout the figures.

Exemplary system 50 comprises first messaging application 5 which may preferably be operatively associated with the sender, a first transformation module 7, messaging infrastructure 10, a second transformation module 13, and a second messaging application 15, which may preferably be operatively associated with the sender. Messaging infrastructure 10 preferably further comprises a database 17, which may preferably comprise various messaging information including routing information. Optionally, messaging infrastructure 10 may comprise optional message broker 20. However, it should be emphasized that system 50 does not require message broker 20, and preferably does not operate with or through message broker 20. Thus, although the present embodiment does not require message broker 20 to be present, the operation of the present embodiment is also not blocked or impaired by the presence of message broker 20.

A message sent from first messaging application 5 to first transformation module 7 is preferably transformed from a first format to a central format, sent to messaging infrastructure 10 for processing as is well known in the art, sent to second transformation module 13 for transformation from a central format to a second format. The message is then routed from second transformation module 13 to second messaging application 15.

Figure 3:
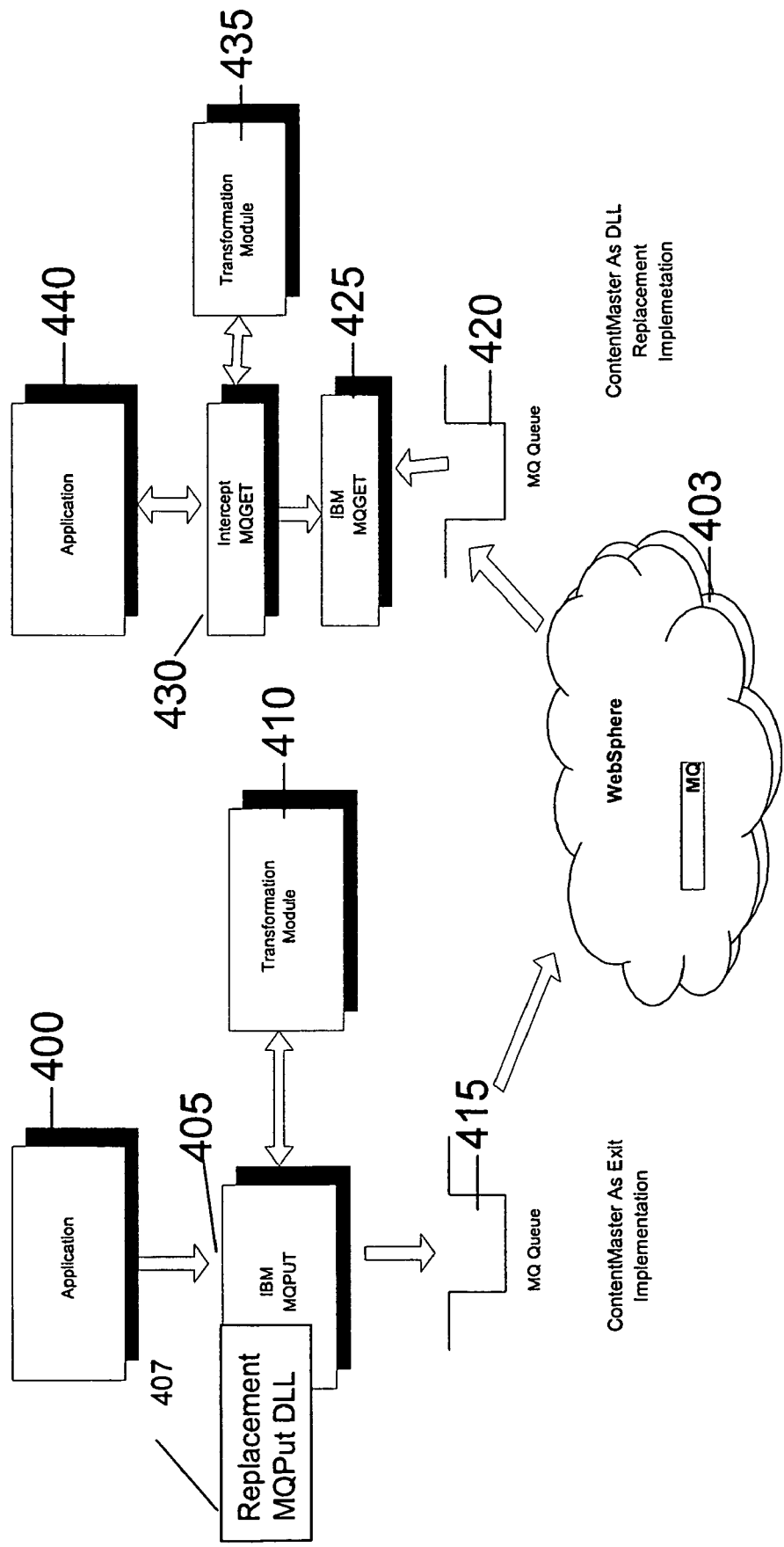
FIG. 3 shows an exemplary operational flow according to a preferred embodiment of the present invention, for operating the system of FIG. 2.

Reference is now made to FIG. 3, which shows an exemplary operational flow according to a preferred embodiment of the present invention, for operating the system of FIG. 2. As shown, the operational flow is initiated by data generation by an application 400, which is operated by a sending computational device (not shown). Application 400 may not be a messaging application, but instead may optionally be involved in document generation and/or management, for example.

For the purposes of this example only and without any intention of being limiting, application 400 may optionally operate through WebSphere MQ™ 403 (IBM Corp, USA). WebSphere MQ™ 403 is a messaging application, for transmitting messages on a message bus. WebSphere MQ™ 403 preferably transmits messages on a message bus according to the instructions given by the human operator during the development process. The following description of the exemplary operational flow is preferably for implementation with WebSphere MQ™ 403.

The generated data is transmitted by application 400 to an MQPut™ process 405, which is able to receive the transformed data for further processing, of WebSphere MQ™ 403, which is the process for outputting data to the message bus (not shown). MQPut™ process 405 can operate on different formats, according to the header structure. MQPut™ process 405 preferably operates according to instructions given by the human operator during the development process. According to the background art, CM, the 2 applications should agree about the message format. Application A (the source application) then prepares the message in the expected format and sends it to the queue using the MQPut command. Application B (the target application) get the message using the MQGet command and then manipulate the data for its own purposes—for example, use only part of the message, transform it to another format, etc. With ContentMaster, the application manager/programmer will define through CM which parser/Serializer should be activated for the specific message. In this way no transformation should be coded inside the application as well as, routing and filtering.

API (Application Programming Interface) exits in WebSphere MQ™ 403 enable programmers to generate code that changes the behavior of API calls of WebSphere MQ™ 403, such as MQPUT™ process 405 and MQGET™ 430, and then insert that code immediately before or immediately after those calls. The insertion is automatic; the queue manager (not shown) drives the exit code at registered points, as is well known in the art. The queue manager holds a mapping of which queue communicates with each application.

A transformation module 410 then optionally intercepts the call from application 400 to MQPut™ process 405, and receives the data which is to be transmitted to MQPut™ process 405.

This implementation requires the presence of an exit point in the operation of WebSphere MQ™ 403, which may optionally be found for those versions designed for MVS, an IBM mainframe operating system, for example.

Transformation module 410 preferably performs the transformation to the central data format, or alternatively and preferably additionally converts data from the central data format to the second data format of the application which is to receive the data. In this example, the receiving application is also receiving messages via WebSphere MQ™ 403 (although this may not affect the data format). The receipt of data by the receiving application via WebSphere MQ™ 403 is not mandated, as messages can pass in between different buses thru devices also known as bridges or gateways. The transformation process may optionally be performed as described above.

In general, the present embodiment is activated when an MQGET™ 430/MQPut™ process 405 is performed and may optionally include one or more of transformation, mapping, routing and filtering of an entire message or only part of a message. Routing may optionally include transmitting data to one or more locations within an organization, more preferably according to data content. A user may preferably define a field in the content, and when the user defined field meets certain criteria, the corresponding messages may preferably be routed to a particular department within an organization. In this embodiment, data filtering is combined with data transformations, such that the data is not only transparently transformed from one format to another, but is also filtered for communication between computers and/or computer systems, and/or storage systems. Thus, this preferred embodiment of the present invention enables data to be transmitted more effectively.

According to a preferred embodiment of the present invention, MQPut™ process 405 preferably features a replacement MQPut DLL 407, in order to be operative with the present embodiment. This enables code required for the present embodiment to communicate with MQPut™ process 405.

Based on the message's content and the transformation module's definition, the message may preferably be rerouted to additional recipients. Through the transformation module (shown as modules 410 or 435 in this figure), such as ContentMaster™ for example, the user can define different target applications based on the message content. For example, for a banking application, message with overdraft field that holds higher value that 3000$ can be routed to urgent-overdraft-treatment while other valued will be routed to general-overdraft-application. The mechanism is simply to check the fields based on the service definition and initiate an MQPut call to the appropriate queue MQPut™ process 405 preferably then receives data, in either the central data format or the second data format, for further processing by the MQ bus. By transforming the content, value is added with a transparent process that does not require change to the underlying transport mechanism.

The data is then further transmitted to a MQ queue™ 415, (or via a bridge to other non-MQ bus implementations).

A MQGet™ process 425 then preferably sends a call to extract the data from MQ queue™ 420. For the purposes of discussion only and without any intention of being limiting, it is assumed that this version of WebSphere MQ™ does not feature an exit point such as the one used in the above MQput example.

For this implementation, transformation module 410 preferably features an intercept process 430, which intercepts the data from the regular MQGet™ process 425 after the data is extracted from the queue. Data may preferably be extracted from the queue and the intercept process is then able to grab data for processing. Intercept process 430 then passes the extracted data to a transformation module 435. Transformation module 435 preferably performs the actual transformation from the central data format to the second data format or from the second data format to a specific variant of the second data format as required by the application that issued the MQget. At the MQGet exit point, the irrelevant data is preferably "cut" or filtered, in order to provide application 440 with the only desired information in its appropriate format. The transformed data is then passed to an application 440, which is preferably operated by a receiving computational device (not shown).

It should be noted that WebSphere MQ™ 403 also enables conventional data transformation, which is completely different than the present embodiment. WebSphere MQ™ 403 can be used to convert application data from one application encoded in one character set to the character set and the encoding required by another application (e.g., ASCII to EBCDIC), when the above-mentioned applications are operating on different platforms. Application data may be converted at the sending queue manager or at the receiving queue manager if suitable user exits are defined. Such data transformation exits are limited to character and encoding transformations in order to deal with platform specific encoding schemes. This is not only a limitation in the intent but also in practice. WebSphere MQ™ 403 comprises data transformation exits which cannot be used to allow transparent "any to any" transformation routing and filtering of messages as proposed by the present embodiment. As previously described, exits are limited to character and encoding transformation.

Figure 4:
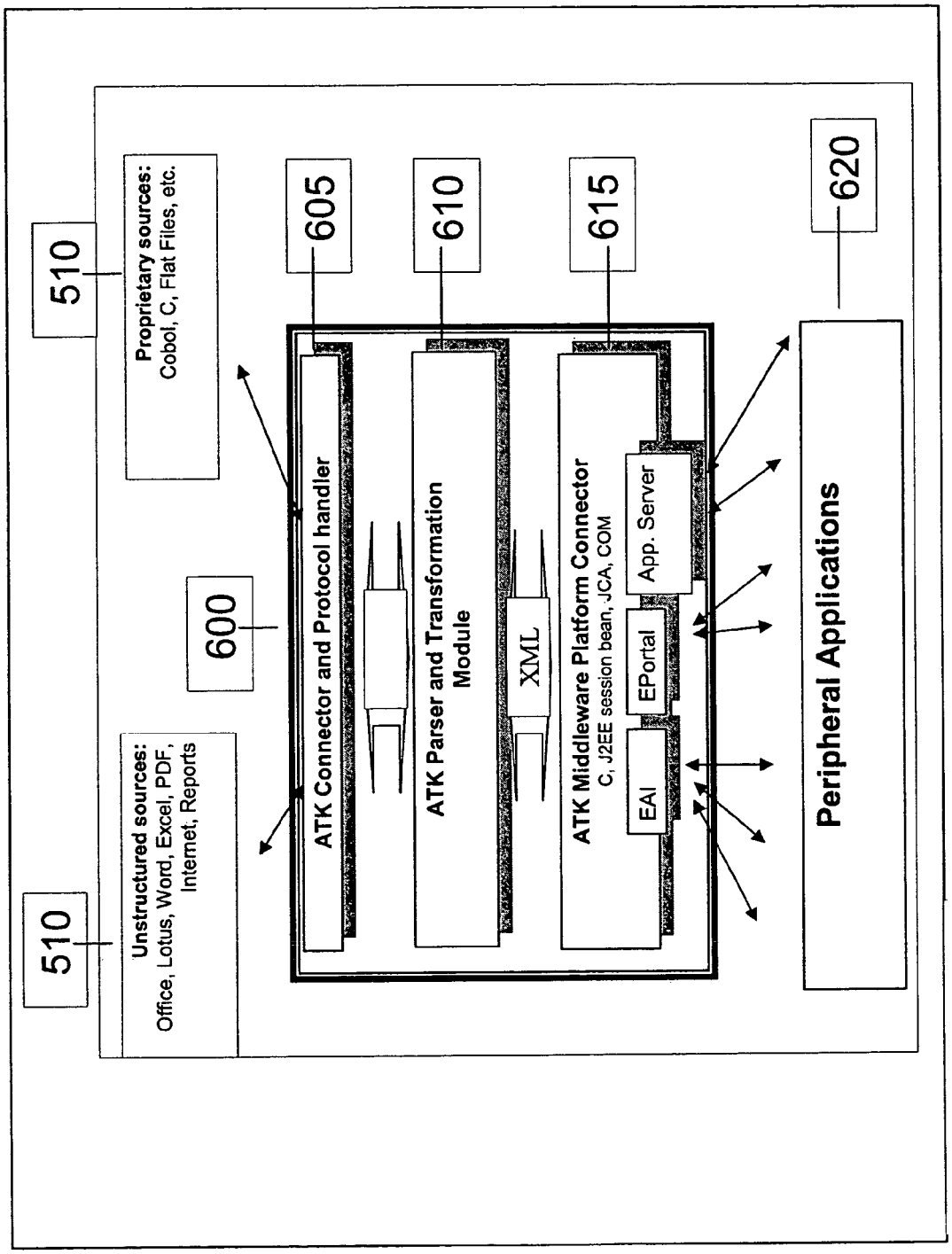
FIG. 4 shows a portion of an adapter toolkit (also referred to as ATK hereinafter) in more detail according to a preferred embodiment of the present invention.

Reference is now made to FIG. 4, which shows a portion of an adapter toolkit (ATK) in more detail according to the present embodiment.

Figure 5:
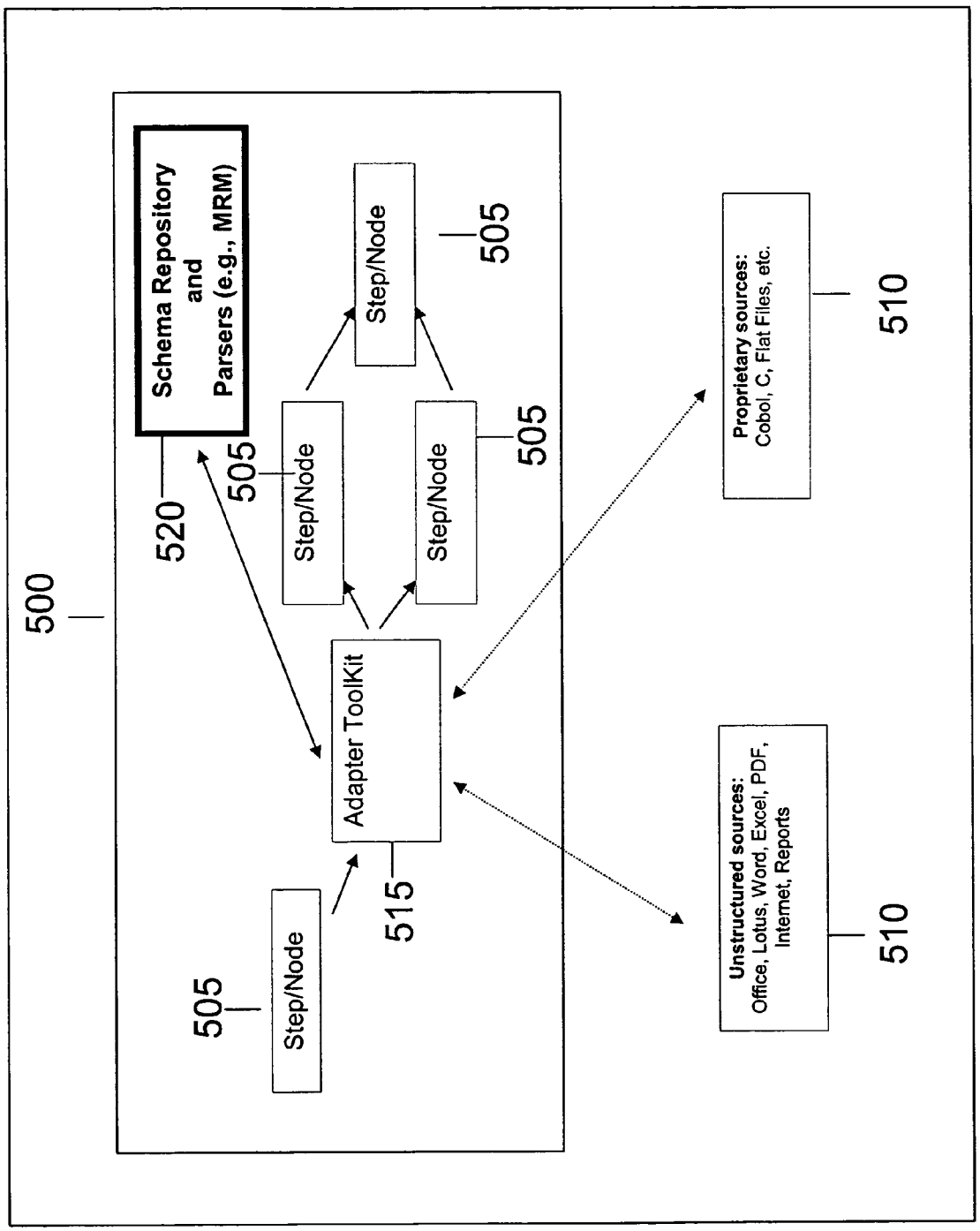
FIG. 5 shows a schematic block diagram of an exemplary adapter 500 for operation with WebSphere MQ™ Integrator.

FIG. 4 shows a portion of an adapter toolkit 515 as described in FIG. 5, specifically an adapter runtime engine 600. Adapter toolkit 515 may optionally be used with an exemplary adapter 500 for operation with WebSphere MQ™ Integrator, as described with regard to FIG. 5, in order to facilitate the operation of the exemplary system of the present invention shown in FIG. 3. Adapter runtime engine 600 is the execution component of adapter toolkit 515, which transforms the received data in real time, as previously described with regard to FIGS. 2-3 above. Adapter runtime engine 600 operates according to the instructions given by the human operator during the development process. Adapter runtime engine 600 preferably features an ATK connector and protocol handler 605, for handling connections to the data sources. As shown also with regard to FIG. 5 below, data is preferably received from a plurality of data sources 510, which may optionally include any type of source for data. Non-limiting examples include unstructured sources of data, such as word processing software, spreadsheet software, and so forth, as well as proprietary sources of data, such as data files issued by output commands from a Cobol program, a C program, proprietary flat files and so forth.

The received data is then preferably passed to an ATK transformation module, for example ATK parser and transformation module 610, which includes transformation functions for transforming data between an original data format and the central data format. As previously described, the central data format is preferably XML. The functions of ATK transformation module, for example ATK parser and transformation module 610 are preferably as described with regard to the transformation module described above.

Adapter runtime engine 600 also preferably features an ATK middleware platform connector 615, which is preferably able to connect standard EAI brokers, portals or application servers.

ATK middleware platform connector 615 may also be operatively associated with one or more peripheral applications 620 including but not limited to a WMQI (WebSphere MQ Integrator) Plugin, WMQ (WebSphere MQ) Plugin, a DB2 Plugin, Biztalk™ and WAS (WebSphere Application Server).

With regard to Biztalk™ implementations, the Biztalk™ server features a messaging subsystem. This messaging subsystem may optionally operate with ATK parser and transformation module 610, in a similar manner as previously described for the WebSphere MQ, for transparent integration between these components.

FIG. 5 shows a schematic block diagram of an exemplary adapter 500 for operation with WebSphere MQ™ Integrator. WebSphere MQ™ Integrator sends data to different nodes upon request by those nodes. Adapter 500 may also optionally be used for the implementation of the present embodiment with the Biztalk™ functionality.

Adapter 500 features a plurality of nodes 505 for requesting the data. The data is preferably received from a plurality of data sources 510, which may optionally include any type of source for data. Non-limiting examples include unstructured sources of data, such as word processing software, spreadsheet software, and so forth, as well as proprietary sources of data, such as Cobol, C, proprietary flat files and so forth. The data is preferably sent to an adapter toolkit 515, which may optionally transform the data into any type of desired format.

Adapter toolkit 515 preferably receives the necessary information to transform the data, including the required mechanisms for such transformation, from a schema repository and parser, such as MRM 520.

Figure 6:
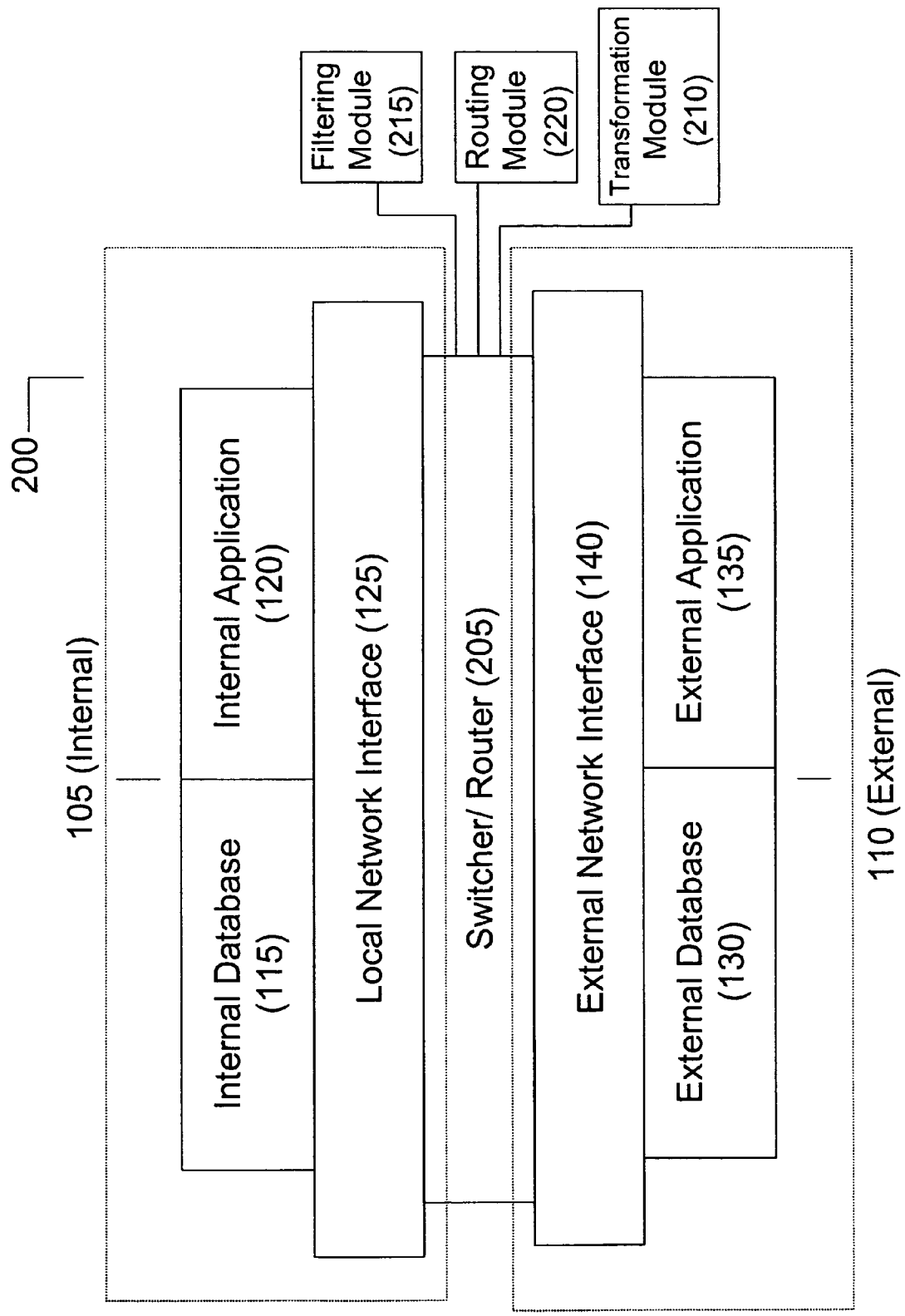
FIG. 6 is a schematic block diagram of another exemplary system according to a preferred embodiment of the present invention.

Reference is now made to FIG. 6, which is a schematic block diagram of an exemplary system according to the present invention.

FIG. 6 shows another exemplary system 200 according to the present invention, for optionally performing routing. System 200 preferably features a switcher/router 205 for routing data and/or messages. Switcher/router 205 may also optionally feature a transformation module 210, although more preferably, transformation module 210 is located outside of switcher/router 205 as shown, and is distributed throughout system 200, as described in greater detail below. System 200 may optionally feature one or more switcher/routers 205, optionally and preferably with a load balancing mechanism (also not shown). Switcher/router 205 preferably receives all data transmissions, for example between internal application(s) 120 and external application(s) 135, and performs the transformation of the data into the central data format first, followed by transformation to the second data format.

More preferably, transformation module 210 within switcher/router 205 performs the data transformation to the central data format. Most preferably, a plurality of transformation modules 210 are present (not shown), each of which is preferably capable of transformation between the central transformation data format and an original data format. As previously described, optionally the central data format is XML, although alternatively any type of central data format could be used.

Transformation module 210 preferably includes a transformation function, for being able to parse the received data in order to perform the transformation between the central transformation data format and an original data format. Transformation module 210 is preferably therefore able to transform complex and/or unstructured data formats, as described in greater detail below with regard to FIG. 7 below.

According to preferred embodiments of the present invention, as previously described, switcher/router 205 is also operatively associated with a filtering module 215 for filtering received data and a routing module 220 for routing the transformed data, in the second data format, to one or more destinations. In alternative preferred embodiments of the present invention features a filtering module 215 and a routing module 220 may be operatively associated with elements other than switcher/router 205 such as internal database 115, internal application(s) 120 operated by an internal computational device 105 for example, local network interface 125, external database 130, external network interface 140 and external application(s) 135.

More preferably, filtering module 215 filters the data after the data has been transformed to the central data format. Thus, optionally one set of filtering tools may be used on data from many different types of applications. Filtering can optionally be activated in the receiving party, such as an external computational device 110 as shown, to make sure the application gets only the relevant data.

The present embodiment's filtering of messages is different than the filtering which is already performed by message brokers. In message broker applications, the user can only filter data according to predefined fields such as name, address, identifier, etc.

The present embodiment goes beyond the limited functionality of background art filtering mechanisms, for exampling filtering mechanisms used in conventional message broker applications, because a user can actually filter on fields that are created by the user within the content. The filtering mechanism of the present embodiment is preferably implemented by extracting data from a message and examining the content of the extracted data.

Conventional message broker applications cannot define fields according to parsing of the content and examination of content. Message broker applications must already have defined fields.

The fields used for filtering in the present embodiment are not necessarily "real" message fields since the message may optionally not be structured around them. Instead, one or more patterns preferably exist in the content, such that the user can define a certain pattern and/or a combination of fixed fields and artificial content-based fields in the content.

Other applications cannot access the body of the message, transparently, without the aid of a centralized mechanism. The central router or the message broker, for example Biztalk™, may be able to access the content of a message and define fields, but the present embodiment enables the sender or receiver to access the content of a message and define fields and actually filter messages.

These user-defined "fields" are therefore preferably content-based, and are preferably used to define one or more rules for transmitting messages. For example a company might decide that an employee is not allowed to receive certain messages as a security measure, and these messages could thus be blocked, regardless of the source of the message. Therefore, blocking would not be limited to preventing transmission of all messages between a sender and a receiver, but could optionally and preferably block or permit transmission of messages according to the content.

One advantage of the use of XML as the central data format is that filtering module 215 is more easily able to filter data which is organized into entities and which has tags for providing information about the data. XML output may be generated from any unstructured, semi-structured, or structured files, records, or messages, such as reports, documents, HTML pages, text forms, etc using a transformation module.

Transformation module 210 may be operatively associated with a transformation engine (not shown) as a plug in component.

The transformation engine (not shown) may preferably be provided as a re-entrant shared library (DLL) that can be called to parse any data source to and from XML. The transformation engine uses transformation scripts, which were generated visually in the transformation design environment.

Transformation modules 210 can optionally be activated using several technological ways: as EJB or COM components (callable components from any application required transformation); as a DLL shared library; as a stand alone server that accepts service calls and works accordingly; or embedded in brokers such as BizTalk™ Server and WebSphere MW Integrator for example.

Figure 7:
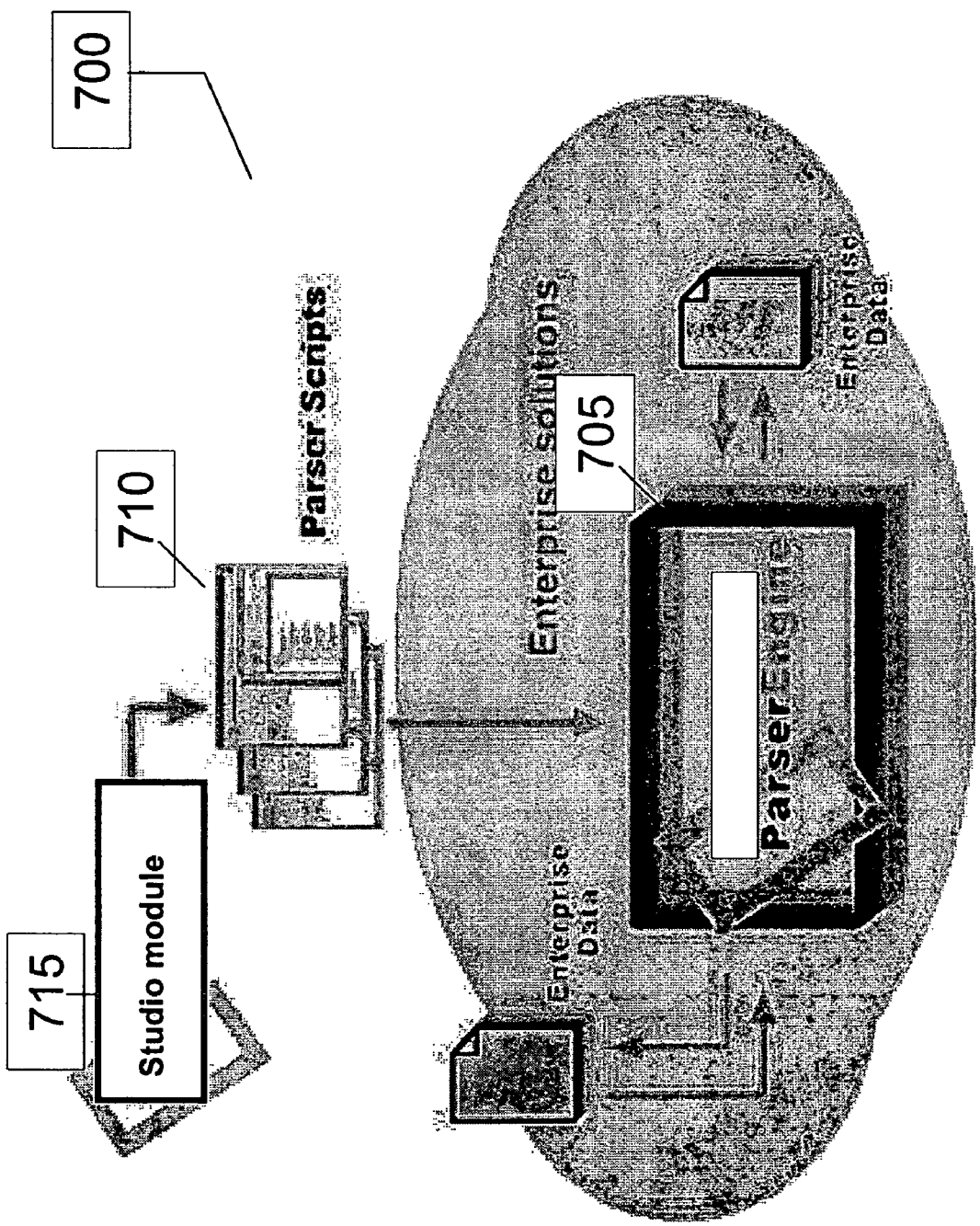
FIG. 7 shows a schematic block diagram of an exemplary development system according to a preferred embodiment of the present invention.

FIG. 7 shows a schematic block diagram of an exemplary development system 700 according to the present invention for constructing the transformation mechanism, for transforming data between an original data format and the central data format. Development system 700 is preferably transparently integrated with the functional components of the present embodiment for actually transforming the data, shown as a transformation module 705 (denoted "parser engine" in FIG. 7). Again, transformation module 705 is preferably implemented as described above.

Transformation module 705 preferably receives one or more scripts 710, which more preferably provide one or more instructions, and/or parameters, for actually transforming the received data. The transformation process enables transformation module 705 to perform the transformation between the original data format and the central data format.

Each script 710 is optionally and preferably constructed, more preferably at least partially manually, through the operation of a studio module 715. Studio module 715 optionally and preferably provides a graphical user interface (GUI), which is not shown, to the human operator, for constructing a script 710. The GUI preferably enables the human operator to select relevant data from a collection of data, such as a document for example, as a guide for transforming the data. The selected data is then preferably mapped to a predefined XML schema, or a schema in any other language which is to be used for the central data format. Optionally and more preferably, studio module 715 is operated without any programming by the human operator.

Studio module 715 also more preferably enables the human operator to define a class of data structures, for example as messages, for "transformation by example". For this function, the human operator defines the class of structures which are sufficiently similar to be transformed according to the same script 710. Optionally and most preferably, the human operator is able to define this class structure by selecting or marking relevant data from an illustrative collection of data. Studio module 715 then preferably generalizes the illustrative structure to an overall class structure.

This process may optionally and preferably be performed in two stages. In the first stage, studio module 715 learns about the illustrative structure, including receiving information about the marked or selected data and the relationships between the data selections. Studio module 715 then preferably generalizes the illustrative structure to the general structure. In the second stage, studio module 715 preferably extracts the necessary data from a document or other collection of data which at least partially matches the general structure. Such a match may optionally be determined according to information given by the human operator, but alternatively may be determined during the actual process of attempting to extract the relevant data. If at least a minimum threshold amount of data is extracted, then the document may optionally be assumed to belong to the general class structure.

Figure 8:
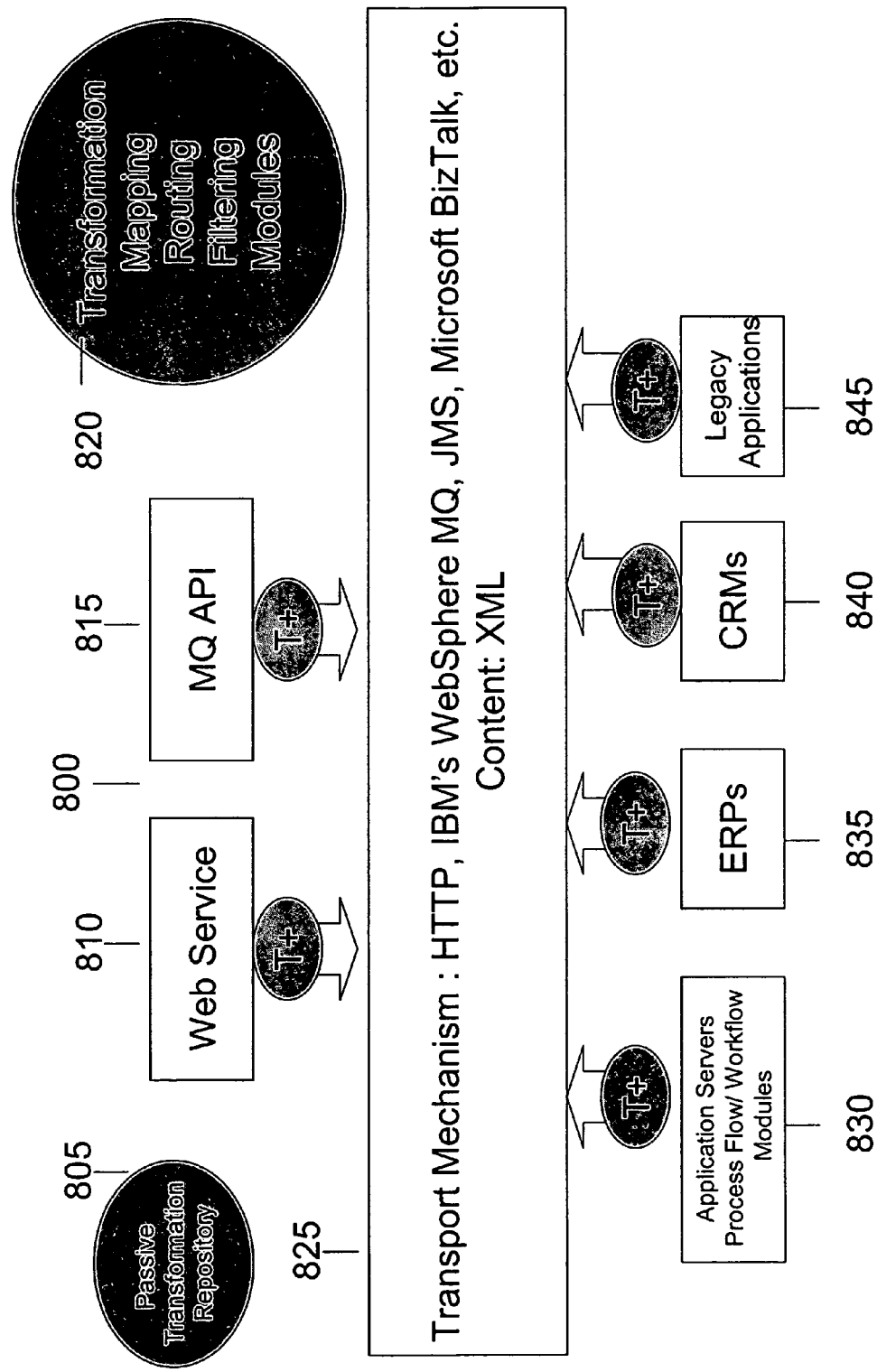
FIG. 8 shows a preferred embodiment of a unique messaging mechanism architecture.

Reference is now made to FIG. 8, which shows a preferred embodiment of the unique messaging mechanism architecture, represented by system 800.

System 800 comprises a passive transformation repository 805, web service 810, a MQ API 815, a transformation mapping, routing, filtering module 820, a transport mechanism 825, an application server process flow/workflow module 830, one or more enterprise resource planning applications (ERPs) 835, one or more CRM applications 840, and one or more legacy applications 845. ERP 835 may preferably comprise SAPs, Oracle applications, BAAN's and Customer Relationship Management (CRM) applications such as Siebel's.

Passive transformation repository 805 holds the information about the available services (filtering, routing, etc.), the location of the services and so on, so that there is one central location for all of the information.

Transport mechanism 825 may preferably comprise a plurality of transport mechanisms including HTTP, IBM MQSeries, JMS, and Biztalk™. The content conveyed to transport mechanism 825 may be in XML or any other appropriate format. Suitable transport mechanisms include but are not limited to: HTTP, WebSphere MQ, and JMS. For each one, a different technological solution may be implemented, according to the previously described technical examples.

Application server process flow/workflow module 830, ERP 835, CRM 840, legacy application 845 may all preferably send and receive messages via the transport mechanism 825.

Web service 810 and MQ API 815 may all preferably be interfaces with the transport mechanism 825.

This solution, which is preferably implemented at the messaging middleware level (e.g. underlying messaging system), allows customers to directly and immediately transform data at the source from any format to any other format, thus enabling every application to accept data in its preferred format.

Figure 9:
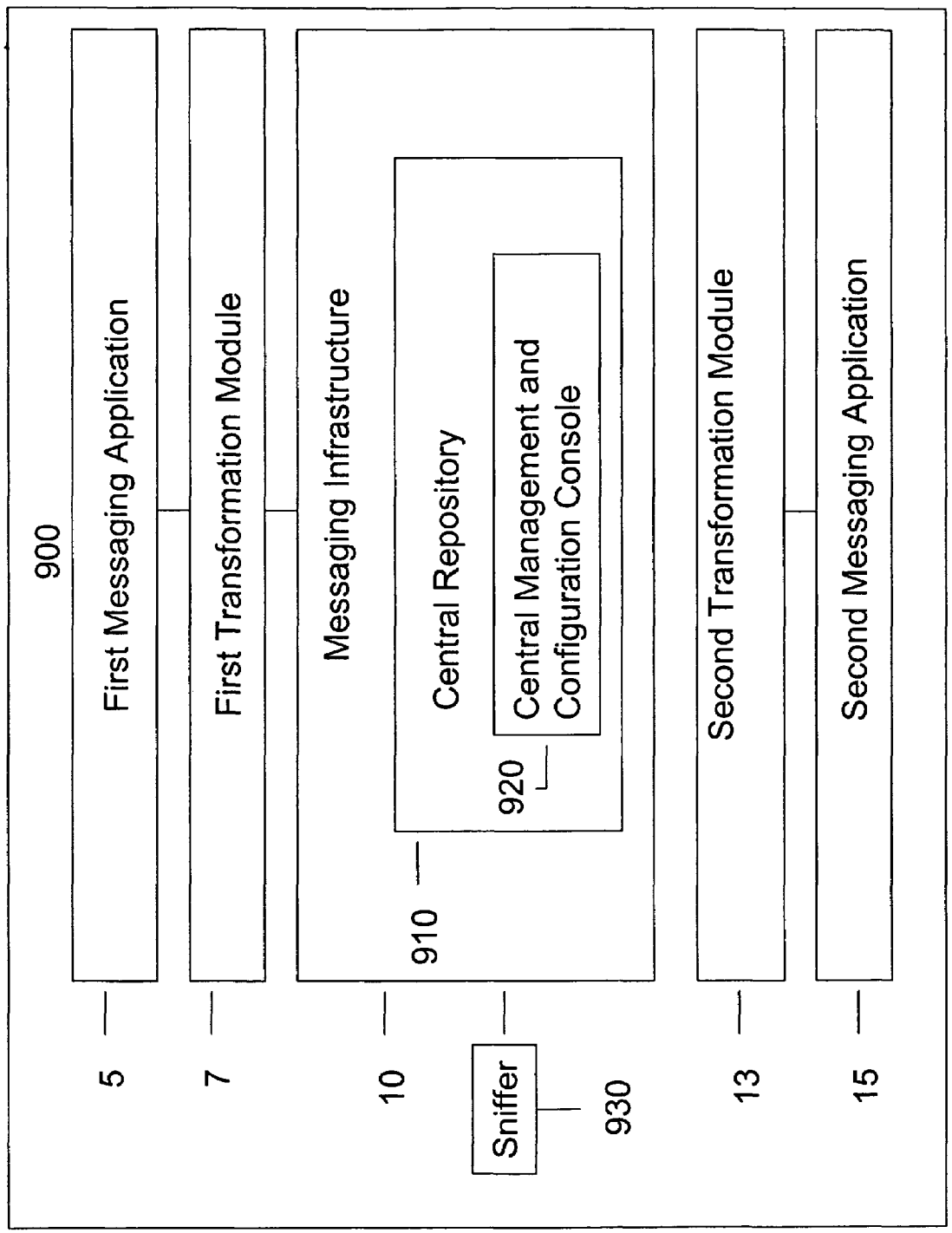
FIG. 9 is a schematic block diagram of yet another exemplary system according to a preferred embodiment of the present invention.

Reference is now made to FIG. 9, which is a schematic block diagram of yet another exemplary system according to the present invention.

A system 900 comprises messaging infrastructure 10, which comprises a central repository 910. Central repository 910 comprises a central management and configuration console 920.

Central repository 910 comprises a central database which lists rules on how to implement filtering, how to implement routing, and where to send updates. Central management and configuration console 920 enables control of the messaging infrastructure, visibility, and telemetry.

Central management and configuration console 920 applies the rules comprised in central repository 910 to the messages in the messaging infrastructure.

From central management and configuration console 920, an administrator can track and control various messaging functions, such as filtering and routing. Central management and configuration console 920 may comprise software or hardware or any combination thereof.

Central management and configuration console 920 may optionally be accessible from one location or from several locations.

Central management and configuration console 920 is also preferably used for tracking changes to messaging administration functions such as filtering and routing.

Central management and configuration console 920 is used for notification and monitoring functions such as error and system management.

Central management and configuration console 920 can also distribute updates and changes to various parts of the system architecture including the rules which control routing and filtering, to the application that's implementing data transformation.

Central management and configuration console 920 is preferably located at a central location, but more preferably enables distributed execution. Execution is preferably performed at distributed points throughout the messaging infrastructure. Distribution of messages is preferably not executed by central management and configuration console 920. Central management and configuration console 920 preferably issues instructions to distributed points throughout the messaging infrastructure on how to distribute messages within their jurisdiction.

Central management and configuration console 920 may preferably access messaging information, as well as real-time diagnostics and may preferably supports multiple views of this information, enabling the administrator to quickly understand information relevant to the problems and issues at hand.

Central management and configuration console 920 may preferably enable the automated creation of topological views that more closely resemble the administrators' intuitive understanding of the messaging network, incorporating geographic, hierarchical and priority information about the messaging network directly into the topological view.

Central management and configuration console 920 is therefore not a message broker. Instead, central management and configuration console 920 is preferably used for administration but not execution. The messages are not being directed to central management and configuration console 920 (as it is for centralized message brokers that are known in the art, in which all messages are directed to a central console or broker); furthermore, central management and configuration console 920 is not responsible for message routing, transport, transformation, etc.

In order to perform monitoring functionality, central management and configuration console 920, is operatively associated with messaging infrastructure 10 and/or is a component of messaging infrastructure 10 (as shown in FIG. 9). Central management and configuration console 920 may preferably be implemented as an external application (e.g. for distribution).

In order to perform error notification functionality, central management and configuration console 920 may preferably be implemented to send a message to an address when an error occurs.

Central management and configuration console 920 could also preferably be implemented to perform necessary tasks with a hook, in other words through sniffing. Sniffing is accomplished via a message sniffer 930, which is a program and/or device that monitors data traveling over a network. Conventional sniffing comprises the sniffing of data packets, as is well known in the art.

The present embodiment optionally and preferably implements the sniffing of messages (such as message sniffing), which is the checking of messages for information, summarizing the information, and sending the summaries to a central manager. Message sniffer 930 may copy messages, set up rules and filters for trapping messages, obtain various statistics, and log statistics and messaging information in numerous ways.

Message sniffing can be used to diagnose problems, to gather statistics for administration, to fine tune message routing, and to detect misrouted and damaged messages.

When sniffing, message sniffer 930 examines a message which is passing a particular point in the messaging system. Message sniffer 930 examines a characteristic or plurality of characteristics of the data and communicates with the central management and configuration console 920, which accesses rules from central repository 910 to determine what message sniffer 930 should do with the message or what additional information message sniffer 930 should look for in the message before taking action. This process may be iterative with several rounds of communication between central repository 910 and message sniffer 930.

In the present embodiment, message sniffer 930 preferably summarizes the information within the messages and sends the summaries to the central management and configuration console 920. Sniffing would preferably be performed to determine how many messages, types of messages, etc. were routed to each address. Message sniffing may preferably be used to also summarize information and makes statistics, etc.

One potential difficulty with message sniffing is that central management and configuration console 920 preferably tracks messages flowing through the messaging infrastructure, but the messages are not passing through a central location.

Sniffer 930 could optionally and preferably comprise several sniffing modules for sniffing at all of the distributed points, or nodes, and passing the sniffed information back to central management and configuration console 920.

In another sniffing embodiment of the present invention, sniffer 930 would preferably be part of a distributed application, which would sniff data, crunch data, and then send data back to central management and configuration console 920.

For example, rules comprised in central repository 910 may instruct sniffer 930 to route all messages addressed to a particular individual directly to that individual, without interference. However, for other workers, rules comprised in central repository 910 may route all messages to such workers but also route a copy of all of these messages to a supervisor, and/or route all of these messages which contain certain keywords to a supervisor.

Rules comprised in central repository 910 may instruct sniffer 930 to send a copy of all messages that originate outside of the intranet or are sent outside of the network to an email address which is monitored by security. Rules comprised in central repository 910 may instruct sniffer 930 to send a copy of all messages, which comprise certain keywords, that originate outside of the intranet or are sent outside of the network to an email address which is monitored by security.

It is expected that during the life of this patent many relevant messaging technologies, message and document formats, and transformation, mapping, parsing and serializing algorithms will be developed and the scope of the term messaging, format, and transformation, mapping, parsing and serializing is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method executed by a computer system, for defining a document format transformation process for automatically transforming documents with a common format, comprising:
   receiving an example document in a first format;
   receiving user input indicating an anchor point within the example document and attributes associated with the anchor point, the anchor point indicating a location within the example document and demarcating a region of data at the location, and the attributes defining an operation to be performed on the region of data;
   associating the anchor point with a position in a central format corresponding to the location of the anchor point in the example document, such that the demarcated region of data is mapped to the central format according to the attributes;
   defining a document format transformation according to the associating of the anchor point with the position in the central format;
   storing the document format transformation in the computer system;
   receiving a similar document in the first format; and
   automatically transforming the similar document into the central format using the document format transformation.

2. The method of claim 1, wherein the similar document is similar to the example document in the first format, and automatically transforming the similar document further comprises:
- locating the anchor point within the similar document using the location and the attributes of the anchor point;
- extracting data from the region demarcated by the located anchor point; and
- inserting the extracted data into the corresponding position in the central format.

3. The method of claim 2, further comprising converting the extracted data prior into an alternate representation to the inserting.

4. The method of claim 2, further comprising specifying an order in which the anchor points are located.

5. The method of claim 2, wherein the anchor point is located in accordance with one of: an absolute location in the similar document, a location relative to another anchor point in the similar document, according to a structure of the similar document, or a content of the similar document.

6. The method of claim 1, wherein the similar document is a message obtained from a messaging application.

7. The method of claim 1, further comprising:
- associating the position in the central format with a corresponding region of a second document in a second format, such that the demarcated region of data is mapped to the corresponding region of the second document;
- defining a translation process using the association of the second document;
- storing the translation process in the computer system;
- receiving a central document received in the central format; and
- automatically translating the central document into the second format using the translation process.

8. The method of claim 7, further comprising:
- obtaining a document in the central format;
- extracting data from the position of the obtained document; and
- inserting the extracted data from the position in the central format into the corresponding region of the second document in the second format.

9. The method of claim 7, further comprising translating a document in the central format into a corresponding document in the second format, in accordance with the translation process.

10. The method of claim 7, further comprising:
- obtaining a first format document in the first format from a source;
- transforming the obtained first format document into the central format at the source;
- transferring the transformed document as a message from the source to a destination; and
- translating the transformed document into the second format at the destination.

11. The method of claim 10, wherein the message is routed from the source to the destination in accordance with a content of the document.

12. The method of claim 10, further comprising filtering the data in the transformed document according to at least one specified characteristic of the data.

13. The method of claim 7, wherein the second format is for an unstructured document.

14. The method of claim 7, wherein the second format is for a structured document.

15. The method of claim 7, wherein the second format is for a semi-structured document, the semi-structured document having both structured and unstructured portions.

16. The method of claim 1, wherein the first format is for an unstructured document.

17. The method of claim 1, wherein the first format is for a structured document.

18. The method of claim 1, wherein the first format is for a semi-structured document, the semi-structured document having both structured and unstructured portions.

19. The method of claim 1, wherein the central format comprises Extensible Markup Language (XML).

20. The method of claim 1, wherein the central format comprises XML Schema Definition (XSD).

21. A system for defining a document format transformation process for automatically transforming documents with a common format, comprising:
- a processor;
- a document markup unit executed by the processor configured to receive user input indicating an anchor point and attributes associated with the anchor point, the anchor point indicating a location within an example document in a first format, the anchor point demarcating a region of data at the location, and the attributes defining an operation to be performed on the region of data; and
- a transformation generator executed by the processor, communicatively coupled with the document markup unit, configured to:
  - associate the anchor point with a position in a central format corresponding to the location of the anchor point in the example document, such that the demarcated region of data is mapped to the central format according to the attributes;
  - define a document format transformation using the association of the example document;
  - store the document format transformation in a storage medium;
  - receive a similar document in the first format; and
  - automatically transform the similar document into the central format using the document format transformation.

22. The system of claim 21, wherein the similar document is similar to the example document in the first format, and the transformation generator is further configured to:
- locate the anchor point within the similar document;
- extract data from the region demarcated by the located anchor point; and
- insert the extracted data into the corresponding position in the central format.

23. The system of claim 21, further comprising a transformation engine for receiving a document in the first format, and transforming the received document into the central format, in accordance with the transformation process.

24. The system of claim 23, wherein the received document is a message obtained from a messaging application.

25. The system of claim 21, wherein the transformation generator is further configured to:
- associate the position in the central format with a corresponding region of a second document in a second format, such that the demarcated region of data is mapped to the corresponding region of the second document;
- define a translation process using the association of the second document;
- store the translation process in the storage medium;
- receive a central document received in the central format; and
- automatically translate the central document into the second format using the translation process.

26. The system of claim 25, further comprising a translation engine operable to receive a document in the central format, and to translate the received document into a second document in the second format, in accordance with the translation process.

27. The system of claim 26, wherein the translation process further comprises:
   obtaining a document the central format;
   extracting data from the position of the obtained document; and
   inserting the extracted data from the associated position in the central format into the corresponding region of the second document in the second format.

28. The system of claim 25, wherein the second format is for an unstructured document.

29. The system of claim 25, wherein the second format is for a structured document.

30. The system of claim 25, wherein the second format is for a semi-structured document, the semi-structured document having both structured and unstructured portions having both structured and unstructured portions.

31. The system of claim 21, wherein the first format is for an unstructured document.

32. The system of claim 21, wherein the first format is for a structured document.

33. The system of claim 21, wherein the first format is for a semi-structured document, the semi-structured document having both structured and unstructured portions.

34. The system of claim 21, wherein the central format comprises Extensible Markup Language (XML).

35. The system of claim 21, wherein the central format comprises XML Schema Definition (XSD).

* * * * *